(12) United States Patent
Munetsugu et al.

(10) Patent No.: US 7,765,468 B2
(45) Date of Patent: Jul. 27, 2010

(54) DATA PROCESSING APPARATUS AND DATA PROCESSING METHOD

(75) Inventors: Toshihiko Munetsugu, Katano (JP); Koichi Emura, Yokohama (JP)

(73) Assignee: Panasonic Corporation, Osaka (JP)

( * ) Notice: Subject to any disclaimer, the term of this patent is extended or adjusted under 35 U.S.C. 154(b) by 2813 days.

(21) Appl. No.: 09/877,035

(22) Filed: Jun. 11, 2001

(65) Prior Publication Data

US 2001/0056506 A1    Dec. 27, 2001

(30) Foreign Application Priority Data

Jun. 14, 2000 (JP) .............................. 2000-177955
May 28, 2001 (JP) .............................. 2001-159409

(51) Int. Cl.
*G06F 17/00* (2006.01)

(52) U.S. Cl. ....................... 715/236; 715/751; 715/719; 709/238; 726/28

(58) Field of Classification Search ................ 719/310; 715/726, 500.1, 724, 236, 202, 738, 837; 369/275.3; 348/515
See application file for complete search history.

(56) References Cited

U.S. PATENT DOCUMENTS 5,969,716 A * 10/1999 Davis et al. .................. 715/726
5,999,173 A * 12/1999 Ubillos ........................ 715/724
6,360,234 B2 * 3/2002 Jain et al. .................. 715/500.1

FOREIGN PATENT DOCUMENTS

| GB | 2330446 | 4/1999 |
|---|---|---|
| GB | 2333001 | 7/1999 |
| JP | 10111872 | 4/1998 |
| JP | 11-288424 | 10/1999 |
| JP | 2000-050233 | 2/2000 |
| JP | 2000-148796 | 5/2000 |

OTHER PUBLICATIONS

Adobe Premiere 5.0 Classroom in a book—Electronic Book on line at: http://proquest.safaribooksonline.com/1568304676—Published Jun. 1998 by Macmillan Computer Publishing USA—Indianapolis, Indiana, 46290, pp. 1-24.*
SMIL 1.0 Specification published Jun. 15, 1998 by W3C at: http://www.w3.org/TR/1998/REC-smil-19980615—pp. 1-43.*
G. Auffert et al., "Audiovisual-Based Hypermedia Authoring: Using Structured Representations for Efficient Access to AV Documents," Hypertext 99 Darmstadt, Feb. 21-25, 1999.
D.C.A. Bulterman et al., "GRiNS: A GRaphical INterface for Creating and Playing SMIL Documents", Computer Networks and ISDN Systems, vol. 30, No. 1-7, Sep. 30, 1998, pp. 519-529.

(Continued)

*Primary Examiner*—Doug Hutton
*Assistant Examiner*—Quoc A Tran
(74) *Attorney, Agent, or Firm*—Greenblum & Bernstein, P.L.C.

(57) ABSTRACT

From structure description data with a structure of media contents described therein is generated representation description data expressive of representation order, representation timing, and synchronization information of media segments described in the structure description data, whereby media segments are capable of being represented under various added restrictions.

14 Claims, 47 Drawing Sheets

OTHER PUBLICATIONS

L. Rutledge et al., "Cooperative Use of MHEG-5 and HyTime", Proceedings of Hypertexts and Hypermedia: Products, Tools, Methods, Sep. 1997.

Hardman et al., "The Amsterdam Hypermedia Model", Communications of the Association for Computing Machinery, vol. 37, No. 2, Feb. 1994, pp. 1-11.

T. Yumoto et al., "A Dynamic Content Integration Language for Video Data and Web Content", Internet, Dec. 10, 2003, pp. 83-92.

English Language Abstract of JP 10-111872.

Takako Hashimoto et al., "Prototype of Digest Viewing System for Television," Information Processing Society of Japan Journal, May 15, 2000, vol. 41, No. SIG3 (TOD6), pp. 71-84, together with an English language partial translation thereof.

Rutledge et al., "Generating Presentation Constraints from Rhetorical Structure," Internet [Online], May 30, 2000-Jun. 3, 2000, pp. 19-32 [URL: http://portal.acm.org/citation.cfm?id=336308], XP001152270.

Rousseau et al., "User adaptable multimedia presentations for the World Wide Web," Computer Networks and ISDN Systems, North Holland Publishing, Amsterdam, NL, vol. 31, 1999, pp. 1273-1290, XP002927097.

Rutledge et al., "Structural Distinctions Between Hypermedia Storage and Presentation," Proceedings of the ACM Multimedia 98, MM '98, Bristol, Sep. 12-16, 1998, ACM International Conference, New York, NY, ACM, US, Sep. 12, 1998, pp. 145-150, XP000977499.

Rutledge et al., "Implementing adaptability in the standard reference model for intelligent multimedia presentation systems", Multimedia Modeling, 1998, MMM '98, Proceedings, 1998 Lausanne, Switzerland Oct. 12-15, 1998, Los Alamitos, CA, USA, IEEE Comput. Soc. US, Oct. 12, 1998, pp. 12-20, XP010309499.

Hunter et al., "A comparison of schemas for video metadata representation", Computer Networks, Elsevier Science Publishers B.V., Amsterdam, NL, vol. 31, No. 11-16, May 17, 1999, pp. 1431-1451, XP004304565.

Erfle R, "Specification of temporal constraints in multimedia documents using HyTime", Internet Dec. 1993, pp. 397-411, http://cajun.cs.nott.ac.uk/compsci/epo/papers/volume6/issue4/ep6x4rxe.pdf.

Auffret et al., "Audiovisual-Based Hypermedia Authoring: Using Structured Representations for Efficient Access to AV Documents," Hypertext 99 Darmstadt, 1999.

Rutledge et al., "Cooperative Use of MHEG-5 and HyTime," Proceedings of Hypertexts and Hypermedia: Products, Tools, Methods (HPTM97), Sep. 1997.

Hardman et al., "The Amsterdam Hypermedia Model," Communications of the ACM, vol. 37, No. 2, Feb. 1994.

"Synchronized Multimedia Integration Language (SMIL) 1.0 Specification," W3C Recommendation [Online], Jun. 15, 1998 [URL: http://www.w3.org/TR/1998/REC-smil-19980615/], XP002934899 (pp. 1-41 are relevant).

* cited by examiner

EXAMPLE OF DTD OF STRUCTURE DESCRIPTION DATA (program0.dtd)

```
<?xml version="1.0"?>
<!ENTITY % types   "(audio|video|image|audiovideo|audioimage)">
<!ENTITY % formats "(mpeg1|mpeg2)">

<!ELEMENT contents  (par|mediaObject)+>                        }201
<!ATTLIST contents  title  CDATA #REQUIRED>                    }202
<!ELEMENT par       (mediaObject+)>                            }203
<!ELEMENT mediaObject (segment+)>                              }204
<!ATTLIST mediaObject type    %types;    "audiovideo"          }205
                      format  %formats;  #REQUIRED>            }206
                      src     CDATA      #REQUIRED>            }207

<!ELEMENT segment   EMPTY>
<!ATTLIST segment   start   CDATA   #REQUIRED                  }208
                    end     CDATA   #REQUIRED>
```

FIG. 2A

EXAMPLE OF XML DOCUMENT OF STRUCTURE DESCRIPTION DATA

```
<?xml version ="1.0"?>
<!DOCTYPE contents SYSTEM "http://mserv.com/DTD/program0.dtd">

<contents title="Movie etc.">
  <mediaObject type="audiovideo" format="mpeg1" src="http://mserv.com/MPEG/movie0.mpg">
    <segment start="00:00:00" end="00:01:00"/>
    <segment start="00:01:00" end="00:02:00"/>
    <segment start="00:03:00" end="00:04:00"/>
    <segment start="00:04:00" end="00:05:00"/>
  </mediaObject>
</contents>
```

FIG. 2B

EXAMPLE OF XML DOCUMENT OF STRUCTURE DESCRIPTION DATA

```
<?xml version="1.0"?>
<!DOCTYPE contents SYSTEM"http://mserv.com/DTD/program0.dtd">

<contents title="Movie etc.">
 <par>
  <mediaObject type="video" format="mpeg1" src="http://mserv.com/MPEG/movie0v.mpv">
   <segment start="00:00:00" end="00:01:00"/>
   <segment start="00:01:00" end="00:02:00"/>
   <segment start="00:03:00" end="00:04:00"/>
   <segment start="00:04:00" end="00:05:00"/>
  </mediaObject>
  <mediaObject type="audio" format="mpeg1" src="http://mserv.com/MPEG/movie0a.mp2">
   <segment start="00:00:00" end="00:01:00"/>
   <segment start="00:01:00" end="00:02:00"/>
   <segment start="00:03:00" end="00:04:00"/>
   <segment start="00:04:00" end="00:05:00"/>
  </mediaObject>
 </par>
</contents>
```

FIG. 3

```
<smil>
  <head>
     [HEADER]}601
  </head>
  <body>
     [BODY]}602
  </body>
</smil>
```

EXAMPLE OF REPRESENTATION DESCRIPTION DATA

```
<smil>
  <body>
    <seq>
      <ref clip-begin="smpte=00:00:00" clip-end="smpte=00:01:00" src="http://mserv.com/MPEG/movie0.mpg"/>
      <ref clip-begin="smpte=00:01:00" clip-end="smpte=00:02:00" src="http://mserv.com/MPEG/movie0.mpg"/>
      <ref clip-begin="smpte=00:03:00" clip-end="smpte=00:04:00" src="http://mserv.com/MPEG/movie0.mpg"/>
      <ref clip-begin="smpte=00:04:00" clip-end="smpte=00:05:00" src="http://mserv.com/MPEG/movie0.mpg"/>
    </seq>
  </body>
</smil>
```

FIG. 7

EXAMPLE OF REPRESENTATION DESCRIPTION DATA

```
<smil>
  <body>
    <seq>
      <ref clip-begin="smpte=00:00:00"clip-end="smpte=00:02:00"src="http://mserv.com/MPEG/movie0.mpg"/>
      <ref clip-begin="smpte=00:03:00"clip-end="smpte=00:05:00"src="http://mserv.com/MPEG/movie0.mpg"/>
    </seq>
  </body>
</smil>
```

FIG. 8

EXAMPLE OF REPRESENTATION DESCRIPTION DATA

```
<smil>
 <body>
  <seq>
   <par>
    <video clip-begin="smpte=00:00:00"clip-end="smpte=00:01:00"src="http://mserv.com/MPEG/movie0v.mpv"/>
    <audio clip-begin="smpte=00:00:00"clip-end="smpte=00:01:00"src="http://mserv.com/MPEG/movie0a.mp2"/>
   </par>
   <par>
    <video clip-begin="smpte=00:01:00"clip-end="smpte=00:02:00"src="http://mserv.com/MPEG/movie0v.mpv"/>
    <audio clip-begin="smpte=00:01:00"clip-end="smpte=00:02:00"src="http://mserv.com/MPEG/movie0a.mp2"/>
   </par>
   <par>
    <video clip-begin="smpte=00:03:00"clip-end="smpte=00:04:00"src="http://mserv.com/MPEG/movie0v.mpv"/>
    <audio clip-begin="smpte=00:03:00"clip-end="smpte=00:04:00"src="http://mserv.com/MPEG/movie0a.mp2"/>
   </par>
   <par>
    <video clip-begin="smpte=00:04:00"clip-end="smpte=00:05:00"src="http://mserv.com/MPEG/movie0v.mpv"/>
    <audio clip-begin="smpte=00:04:00"clip-end="smpte=00:05:00"src="http://mserv.com/MPEG/movie0a.mp2"/>
   </par>
  </seq>
 </body>
</smil>
```

FIG. 10

EXAMPLE OF REPRESENTATION DESCRIPTION DATA

```
<smil>
 <body>
  <seq>
   <par>
    <video clip-begin="smpte=00:00:00"clip-end="smpte=00:01:00"src="http://mserv.com/MPEG/movie0v.mpv"/>
    <audio clip-begin="smpte=00:00:00"clip-end="smpte=00:01:00"src="http://mserv.com/MPEG/movie0a.mp2"/>
   </par>
   <par>
    <video clip-begin="smpte=00:03:00"clip-end="smpte=00:05:00"src="http://mserv.com/MPEG/movie0v.mpv"/>
    <audio clip-begin="smpte=00:03:00"clip-end="smpte=00:05:00"src="http://mserv.com/MPEG/movie0a.mp2"/>
   </par>
  </seq>
 </body>
</smil>
```

FIG. 11

EXAMPLE OF REPRESENTATION DESCRIPTION DATA

```
<smil>
  <body>
    <seq>
      <par>
        <video clip-begin="smpte=00:00:00"clip-end="smpte=00:01:00"src="http://mserv.com/MPEG/movie0v.mpv"/>
        <audio begin="10s"clip-begin="smpte=00:00:10"clip-end="smpte=00:00:40"src="http://mserv.com/MPEG/movie0a.mp2"/>
      </par>
      <par>
        <video clip-begin="smpte=00:01:00"clip-end="smpte=00:02:00"src="http://mserv.com/MPEG/movie0v.mpv"/>
        <audio clip-begin="smpte=00:01:00"clip-end="smpte=00:02:00"src="http://mserv.com/MPEG/movie0a.mp2"/>
      </par>
      <par>
        <video clip-begin="smpte=00:03:00"clip-end="smpte=00:04:00"src="http://mserv.com/MPEG/movie0v.mpv"/>
        <audio clip-begin="smpte=00:03:00"clip-end="smpte=00:04:00"src="http://mserv.com/MPEG/movie0a.mp2"/>
      </par>
      <par>
        <video clip-begin="smpte=00:04:00"clip-end="smpte=00:05:00"src="http://mserv.com/MPEG/movie0v.mpv"/>
        <audio begin="15s"clip-begin="smpte=00:04:15"clip-end="smpte=00:05:00"src="http://mserv.com/MPEG/movie0a.mp2"/>
      </par>
    </seq>
  </body>
</smil>
```

FIG. 12

EXAMPLE OF DTD OF STRUCTURE DESCRIPTION DATA (program1.dtd)

```
<?xml version="1.0"?>
<!ENTITY %   types      "(audio|video|image|audiovideo|audioimage)">
<!ENTITY %   formats    "(mpeg1|mpeg2|gif|jpeg)">

<!ELEMENT    contents    (par|mediaObject)+>      }1301
<!ATTLIST    contents    tite    CDATA    #REQUIRED>  }1302
<!ELEMENT    par         (mediaObject+)>  }1303
<!ELEMENT    mediaObject (segment+)>  }1304
<!ATTLIST    mediaObject type    %types;      "audiovideo"  }1305
                         format  %formats;  #REQUIRED    }1306
                         src     CDATA      #REQUIRED>   }1307
<!ELEMENT    segment     (alt*)>  }1309
<!ATTLIST    segment     start   CDATA    #REQUIRED    }1308
                         end     CDATA    #REQUIRED>
<!ELEMENT    alt         (pos?)>
<!ATTLIST    alt         type    %types;    #REQUIRED
                         format  %formats;  #REQUIRED   }1310
                         src     CDATA      #REQUIRED>
<!ELEMENT    pos         EMPTY>
<!ATTLIST    pos         start   CDATA    #REQUIRED
                         end     CDATA    #REQUIRED>
```

FIG. 13

EXAMPLE OF XML DOCUMENT OF STRUCTURE DESCRIPTION DATA

```
<?xml version="1.0"?>
<!DOCTYPE contents SYSTEM"http://mserv.com/DTD/program1.dtd">
<contents title="Movie etc.">
<mediaObject type="audiovideo"format="mpeg1"src="http://mserv.com/MPEG/movie0v.mpg" >
 <segment start="00:00:00"end="00:01:00">
  <alt type="image"format="jpeg"src="http://mserv.com/Image/s0.jpg">
  </alt>
  <alt type="audio"format="mpeg1"src="http://mserv.com/MPEG/movie0a.mp2" >
   <pos start="00:00:00" end="00:01:00"/>
  </alt>
 </segment>
 <segment start="00:01:00"end="00:02:00">
  <alt type="image"format="jpeg"src="http://mserv.com/Image/s1.jpg" >
  </alt>
  <alt type="audio"format="mpeg1"src="http://mserv.com/MPEG/movie0a.mp2" >
   <pos start="00:01:00" end="00:01:30"/>
  </alt>
 </segment>
 <segment start="00:03:00"end="00:04:00">
  <alt type="image"format="jpeg"src="http://mserv.com/Image/s3.jpg" >
  </alt>
  <alt type="audio"format="mpeg1"src="http://mserv.com/MPEG/movie0a.mp2" >
   <pos start="00:03:00" end="00:03:30"/>
  </alt>
 </segment>
 <segment start="00:04:00"end="00:05:00">
  <alt type="image"format="jpeg"src="http://mserv.com/Image/s4.jpg" >
  </alt>
  <alt type="audio"format="mpeg1"src="http://mserv.com/MPEG/movie0a.mp2" >
   <pos start="00:04:00" end="00:05:00"/>
  </alt>
 </segment>
</mediaObject>
</contents>
```

FIG. 14

EXAMPLE OF XML DOCUMENT OF STRUCTURE DESCRIPTION DATA

```
<?xml verslon="1.0"?>
<!DOCTYPE contents SYSTEM"http://mserv.com/DTD/program3.dtd">

<contents title="Movie etc.">
  <par>
    <mediaObject type="video"format="mpeg1"src="http://mserv.com/MPEG/movie0v.mpv">
      <segment start="00:00:00"end="00:01:00">
        <alt type="image"format="jpeg"src="http://mserv.com/Image/s0.jpg">
        </alt>
      </segment>
      <segment start="00:01:00"end="00:02:00">
        <alt type="image"format="jpeg"src="http://mserv.com/Image/s1.jpg">
        </alt>
      </segment>
      <segment start="00:03:00"end="00:04:00">
        <alt type="image"format="jpeg"src="http://mserv.com/Image/s3.jpg">
        </alt>
      </segment>
      <segment start="00:04:00"end="00:05:00">
        <alt type="image"format="jpeg"src="http://mserv.com/Image/s4.jpg">
        </alt>
      </segment>
    </mediaObject>
    <mediaObject type="audio"format="mpeg1"src="http://mserv.com/MPEG/movie0a.mp2">
      <segment start="00:00:00"end="00:01:00">
        <alt type="audio"format="mpeg1"src="http://mserv.com/MPEG/movie0a.mp2">
          <pos start="00:00:00"end="00:01:00"/>
        </alt>
      </segment>
      <segment start="00:01:00"end="00:02:00">
        <alt type="audio"format="mpeg1"src="http://mserv.com/MPEG/movie0a.mp2">
          <pos start="00:01:00"end="00:01:30"/>
        </alt>
      </segment>
      <segment start="00:03:00"end="00:04:00">
        <alt type="audio"format="mpeg1"src="http://mserv.com/MPEG/movie0a.mp2">
          <pos start="00:03:00"end="00:03:30"/>
        </alt>
      </segment>
      <segment start="00:04:00"end="00:05:00">
        <alt type="audio"format="mpeg1"src="http://mserv.com/MPEG/movie0a.mp2">
          <pos start="00:04:00"end="00:05:00"/>
        </alt>
      </segment>
    </mediaObject>
  </par>
</contents>
```

FIG. 15

EXAMPLE OF REPRESENTATION DESCRIPTION DATA

```
<smil>
  <body>
    <seq>
      <par endsync="id(a0)">
        <img src="http://mserv.com/Image/s0.jpg"/>
        <audeo id="a0" clip-begin="smpte=00:00:00" clip-end="smpte=00:01:00" src="http://mserv.com/MPEG/movie0a.mp2"/>  ⎬1701
      </par>
      <par endsync="id(a1)">
        <img src="http://mserv.com/Image/s1.jpg"/>
        <audeo id="a1" clip-begin="smpte=00:01:00" clip-end="smpte=00:01:30" src="http://mserv.com/MPEG/movie0a.mp2"/>  ⎬1702
      </par>
      <par endsync="id(a2)">
        <img src="http://mserv.com/Image/s3.jpg"/>
        <audeo id="a2" clip-begin="smpte=00:03:00" clip-end="smpte=00:03:30" src="http://mserv.com/MPEG/movie0a.mp2"/>  ⎬1703
      </par>
      <par endsync="id(a3)">
        <img src="http://mserv.com/Image/s4.jpg"/>
        <audeo id="a3" clip-begin="smpte=00:04:00" clip-end="smpte=00:05:00" src="http://mserv.com/MPEG/movie0a.mp2"/>  ⎬1704
      </par>
    </seq>
  </body>
</smil>
```

FIG. 17

EXAMPLE OF REPRESENTATION DESCRIPTION DATA

```
<smil>
  <body>                                    2000
    <switch>
      <seq system-bitrate="56000">
        <ref clip-begin="smpte=00:00:00" clip-end="smpte=00:01:00" src="http://mserv.com/MPEG/movie0.mpg"/>
        <ref clip-begin="smpte=00:01:00" clip-end="smpte=00:02:00" src="http://mserv.com/MPEG/movie0.mpg"/>    2001
        <ref clip-begin="smpte=00:03:00" clip-end="smpte=00:04:00" src="http://mserv.com/MPEG/movie0.mpg"/>
        <ref clip-begin="smpte=00:04:00" clip-end="smpte=00:05:00" src="http://mserv.com/MPEG/movie0.mpg"/>
      </seq>
      <seq>
        <par endsync="id(a0)">
          <img src="http://mserv.com/Image/s0.jpg"/>
          <audio id="a0" clip-begin="smpte=00:00:00" clip-end="smpte=00:01:00" src="http://mserv.com/MPEG/movie0a.mp2"/>
        </par>
        <par endsync="id(a1)">
          <img src="http://mserv.com/Image/s1.jpg"/>
          <audio id="a1" clip-begin="smpte=00:01:00" clip-end="smpte=00:01:30" src="http://mserv.com/MPEG/movie0a.mp2"/>    2002
        </par>
        <par endsync="id(a2)">
          <img src="http://mserv.com/Image/s3.jpg"/>
          <audio id="a2" clip-begin="smpte=00:03:00" clip-end="smpte=00:03:30" src="http://mserv.com/MPEG/movie0a.mp2"/>
        </par>
        <par endsync="id(a3)">
          <img src="http://mserv.com/Image/s4.jpg"/>
          <audio id="a3" clip-begin="smpte=00:04:00" clip-end="smpte=00:05:00" src="http://mserv.com/MPEG/movie0a.mp2"/>
        </par>
      </seq>
    </switch>
  </body>
</smil>
```

FIG. 20

DTD:
```
<!ELEMENT  alt       (copdition*,pos?)>
<!ATTLIST  alt       type    %types:    #REQUIRED
                     format  %formats;  #REQUIRED
                     src     CDATA      #REQUIRED>
<!ELEMENT  condition (#PCDATA)>
```

FIG. 21A

STRUCTURE DESCRIPTION DATA

```
<all typed"Image"format="jpeg"src="http://mserv.com/Image/s0.jpg">
  <condition>narrow band</condition>
</alt>
```

FIG. 21B

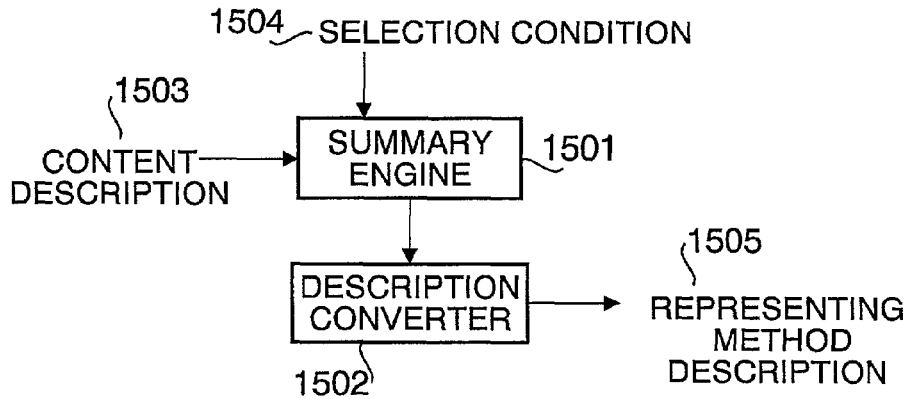

FIG. 22

EXAMPLE OF DTD OF STRUCTURE DESCRIPTION DATA (program2.dtd)

```
<?xml version="1.0"?>
<!ENTITY %  types      "(audio|video|image|audiovideo|audioimage)">
<!ENTITY %  formats    "(mpeg1|mpeg2)">

<!ELEMENT   contents    (par|mediaObject)+>
<!ATTLIST   contents    tite    CDATA   #REQUIRED>
<!ELEMENT   par         (mediaObject)+>
<!ELEMENT   mediaObject (segment+)>
<!ATTLIST   mediaObject type    %types;     "audiovideo"
                        format  %formats;   #REQUIRED
                        src     CDATA       #REQUIRED>
<!ELEMENT   segment     EMPTY>
<!ATTLIST   segment     start   CDATA   #REQUIRED
                        end     CDATA   #REQUIRED
                        score   NMTOKEN #REQUIRED>  }2301
```

FIG. 23

EXAMPLE OF XML DOCUMENT OF STRUCTURE DESCRIPTION DATA

```
<?xml version="1.0"?>
<!DOCTYPE contents SYSTEM"http://mserv.com/DTD/program2.dtd">

<contents title="Movie etc.">
<mediaObject type="audio video" format="mpeg1" src="http://mserv.com/MPEG/movie0.mpg">
  <segment start="00:00:00" end="00:01:00" score="1"/>
  <segment start="00:01:00" end="00:02:00" score="3"/>
  <segment start="00:02:00" end="00:03:00" score="4"/>
  <segment start="00:03:00" end="00:04:00" score="5"/>
  <segment start="00:04:00" end="00:05:00" score="3"/>
</mediaObject>
</contents>
```
2401

FIG. 24

EXAMPLE OF XML DOCUMENT OF INTERMEDIATE TYPE OF STRUCTURE DESCRIPTION DATA

```
<?xml version="1.0"?>
<!DOCTYPE contents SYSTEM"http://mserv.com/DTD/program2.dtd">

<contents title="Movie etc.">
  <mediaObject type="audiovideo"format="mpeg1"src="http://mserv.com/MPEG/movie0.mpg">
    <segment start="00:02:00" end="00:03:00" score="4">
    <segment start="00:03:00" end="00:04:00" score="5">  } 2601
  </mediaObject>
</contents>
```

FIG. 26

EXAMPLE OF XML DOCUMENT OF STRUCTURE DESCRIPTION DATA

```
<?xml verslon="1.0"?>
<!DOCTYPE contents SYSTEM"http://mserv.com/DTD/program2.dtd">

<contents title="Movie etc.">
<par>
    <mediaObject type="video"format="mpeg1"src="http://mserv.com/MPEG/movie0v.mpv">     ⎫
    <segment start="00:00:00"end="00:01:00"score="1"/>                                   ⎬ 2701
    <segment start="00:01:00"end="00:02:00"score="3"/>                                   ⎪
    <segment start="00:02:00"end="00:03:00"score="4"/>                                   ⎪
    <segment start="00:03:00"end="00:04:00"score="5"/>         ⎫                         ⎪
    <segment start="00:04:00"end="00:05:00"score="3"/>         ⎬ 2703                    ⎪
    </mediaObject>                                                                       ⎭
    <mediaObject type="audio"format="mpeg1"src="http://mserv.com/MPEG/movie0a.mp2">      ⎫
    <segment start="00:00:00"end="00:01:00"score="1"/>                                   ⎪
    <segment start="00:01:00"end="00:02:00"score="3"/>                                   ⎪
    <segment start="00:02:00"end="00:03:00"score="5"/>         ⎫                         ⎬ 2702
    <segment start="00:03:00"end="00:04:00"score="5"/>         ⎬ 2704                    ⎪
    <segment start="00:04:00"end="00:05:00"score="3"/>         ⎭                         ⎪
    </mediaObject>                                                                       ⎭
</par>
</contents>
```

FIG. 27

EXAMPLE OF XML DOCUMENT OF INTERMEDIATE TYPE OF STRUCTURE DESCRIPTION DATA

```
<?xml verslon="1.0"?>
<!DOCTYPE contents SYSTEM"http://mserv.com/DTD/program2.dtd">

<contents title="Movie etc.">
 <par>
  <mediaObject type="video"format="mpeg1"src="http://mserv.com/MPEG/movie0v.mpv">
   <segment start="00:02:00"end="00:03:00"score="4">
   <segment start="00:03:00"end="00:04.:00"score="5">            2901
  </mediaObject>
  <mediaObject type="audio"format="mpeg1"src="http://mserv.com/MPEG/movie0a.mp2">
   <segment start="00:02:00"end="00:03:00"score="5">
   <segment start="00:03:00"end="00:04.:00"score="5">            2902
  </mediaObject>
 </par>
</contents>
```

FIG. 29

EXAMPLE OF DTD OF STRUCTURE DESCRIPTION DATA (program3.dtd)

```
<?xml version="1.0"?>
<!ENTITY % types    "(audio|video|image|audiovideo|audioimage)">
<!ENTITY % formats  "(mpeg1|mpeg2)">

<!ELEMENT  contents    (par|mediaObject)+>
<!ATTLIST  contents    tite    CDATA   #REQUIRED>
<!ELEMENT  par         (mediaObject+)>
<!ELEMENT  mediaObject (segment)>
<!ATTLIST  mediaObject type    %types;   "audiovideo"
                       format  %formats; #REQUIRED
                       src     CDATA     #REQUIRED>
<!ELEMENT  segment     (alt*)>
<!ATTLIST  segment     start   CDATA     #REQUIRED
                       end     CDATA     #REQUIRED
                       score   NMTOKEN   #REQUIRED>   } 3001
<!ELEMENT  alt         (pos?)>
<!ATTLIST  alt         type    %types;   #REQUIRED
                       format  %formats; #REQUIRED
                       src     CDATA     #REQUIRED>
<!ELEMENT  pos         EMPTY>
<!ATTLIST  pos         start   CDATA     #REQUIRED
                       end     CDATA     #REQUIRED>
```

FIG. 30

EXAMPLE OF XML DOCUMENT OF STRUCTURE DESCRIPTION DATA

```
<?xml verslon="1.0"?>
<!DOCTYPE contents SYSTEM"http://mserv.com/DTD/program3.dtd">

<contents title="Movie etc.">
  <mediaObject type="audiovideo"format="mpeg1"src="http://mserv.com/MPEG/movie0.mpg">
    <segment start="00:00:00"end="00:01:00"score="1">
      <alt type="image"format="jpeg"src="http://mserv.com/Image/s0.jpg">
      </alt>
      <alt type="audio"format="mpeg1"src="http://mserv.com/MPEG/movie0a.mp2">
        <pos start="00:00:00"end="00:01:00"/>
      </alt>
    </segment>
    <segment start="00:01:00"end="00:02:00"score="3">
      <alt type="image"format="jpeg"src="http://mserv.com/Image/s1.jpg">
      </alt>
      <alt type="audio"format="mpeg1"src="http://mserv.com/MPEG/movie0a.mp2">
        <pos start="00:01:00"end="00:01:30"/>
      </alt>
    </segment>
    <segment start="00:02:00"end="00:03:00"score="4">
      <alt type="image"format="jpeg"src="http://mserv.com/Image/s2.jpg">
      </alt>
      <alt type="audio"format="mpeg1"src="http://mserv.com/MPEG/movie0a.mp2">
        <pos start="00:02:00"end="00:03:00"/>
      </alt>
    </segment>
    <segment start="00:03:00"end="00:04:00"score="5">
      <alt type="image"format="jpeg"src="http://mserv.com/Image/s3.jpg">
      </alt>
      <alt type="audio"format="mpeg1"src="http://mserv.com/MPEG/movie0a.mp2">
        <pos start="00:03:00"end="00:03:30"/>
      </alt>
    </segment>
    <segment start="00:04:00"end="00:05:00"score="3">
      <alt type="image"format="jpeg"src="http://mserv.com/Image/s4.jpg">
      </alt>
      <alt type="audio"format="mpeg1"src="http://mserv.com/MPEG/movie0a.mp2">
        <pos start="00:04:00"end="00:05:00"/>
      </alt>
    </segment>
  </mediaObject>
</contents>
```

FIG. 31

EXAMPLE OF XML DOCUMENT OF INTERMEDIATE TYPE OF STRUCTURE DESCRIPTION DATA

```
<?xml version="1.0"?>
<!DOCTYPE contents SYSTEM"http://mserv.com/DTD/program3.dtd">

<contents title="Movie etc.">
<mediaObject type="audiovideo"format="mpeg1"src="http://mserv.com/MPEG/movie0v.mpg">
  <segment start="00:02:00" end="00:03:00"score="4">
    <alt type="image"format="jpeg"src="http://mserv.com/Image/s2.jpg">
    </alt>
    <alt type="audio"format="mpeg1"src="http://mserv.com/MPEG/movie0a.mp2">
      <pos start="00:02:00" end="00:03:00"/>
    </alt>
  </segment>
  <segment start="00:03:00" end="00:04:00"score="5">
    <alt type="image"format="jpeg"src="http://mserv.com/Image/s3.jpg">
    </alt>
    <alt type="audio"format="mpeg1"src="http://mserv.com/MPEG/movie0a.mp2">
      <pos start="00:03:00" end="00:03:30"/>
    </alt>
  </segment>
</mediaObject>
</contents>
```

FIG. 32

EXAMPLE OF XML DOCUMENT OF STRUCTURE DESCRIPTION DATA

```xml
<?xml verslon="1.0"?>
<!DOCTYPE contents SYSTEM"http://mserv.com/DTD/program3.dtd">

<contents title="Movie etc.">
  <par>
    <mediaObject type="video"format="mpeg1"src="http://mserv.com/MPEG/movie0v.mpv">
      <segment start="00:00:00"end="00:01:00"score="1">
        <alt type="image"format="jpeg"src="http://mserv.com/Image/s0.jpg"></alt>
      </segment>
      <segment start="00:01:00"end="00:02:00"score="3">
        <alt type="image"format="jpeg"src="http://mserv.com/Image/s1.jpg"></alt>
      </segment>
      <segment start="00:02:00"end="00:03:00"score="4">
        <alt type="image"format="jpeg"src="http://mserv.com/Image/s2.jpg"></alt>
      </segment>
      <segment start="00:03:00"end="00:04:00"score="5">
        <alt type="image"format="jpeg"src="http://mserv.com/Image/s3.jpg"></alt>
      </segment>
      <segment start="00:04:00"end="00:05:00"score="3">
        <alt type="image"format="jpeg"src="http://mserv.com/Image/s0.jpg"></alt>
      </segment>
    </mediaObject>
    <mediaObject type="audio"format="mpeg1"src="http://mserv.com/MPEG/movie0a.mp2">
      <segment start="00:00:00"end="00:01:00"score="1">
        <alt type="audio"format="mpeg1"src="http://mserv.com/MPEG/movie0a.mp2">
          <pos start="00:00:00"end="00:01:00"/>
        </alt>
      </segment>
      <segment start="00:01:00"end="00:02:00"score="3">
        <alt type="audio"format="mpeg1"src="http://mserv.com/MPEG/movie0a.mp2">
          <pos start="00:01:00"end="00:02:00"/>
        </alt>
      </segment>
      <segment start="00:02:00"end="00:03:00"score="5">
        <alt type="audio"format="mpeg1"src="http://mserv.com/MPEG/movie0a.mp2">
          <pos start="00:02:00"end="00:03:00"/>
        </alt>
      </segment>
      <segment start="00:03:00"end="00:04:00"score="5">
        <alt type="audio"format="mpeg1"src="http://mserv.com/MPEG/movie0a.mp2">
          <pos start="00:03:00"end="00:03:30"/>
        </alt>
      </segment>
      <segment start="00:04:00"end="00:05:00"score="3">
        <alt type="audio"format="mpeg1"src="http://mserv.com/MPEG/movie0a.mp2">
          <pos start="00:04:00"end="00:05:00"/>
        </alt>
      </segment>
    </mediaObject>
  </par>
</contents>
```

FIG. 33

EXAMPLE OF XML DOCUMENT OF INTERMEDIATE TYPE OF STRUCTURE DESCRIPTION DATA

```
<?xml version="1.0"?>
<!DOCTYPE contents SYSTEM"http://mserv.com/DTD/program3.dtd">
<contents title="Movie etc.">
<par>
<mediaObject type="video"format="mpeg1"src="http://mserv.com/MPEG/movie0v.mpv">
 <segment start="00:02:00"end="00:03.:00"score="4">
  <alt type="image"format="jpeg"src="http://mserv.com/Image/s2.jpg">
  </alt>
 </segment>
 <segment start="00:03:00"end="00:04.:00"score="5">
  <alt type="image"format="jpeg"src="http://mserv.com/Image/s3.jpg">
  </alt>
 </segment>
</mediaObject>
<mediaObject type="audio"format="mpeg1"src="http://mserv.com/MPEG/movie0a.mp2">
 <segment start="00:02:00"end="00:03.:00"score="5">
  <alt type="image"format="jpeg1"src="http://mserv.com/MPEG/movie0a.mp2">
   <pos start="00:02:00"end="00:03:00"/>
  </alt>
 </segment>
 <segment start="00:03:00"end="00:04.:00"score="5">
  <alt type="audio"format="jpeg1"src="http://mserv.com/MPEG/movie0a.mp2">
   <pos start="00:03:00"end="00:03:30"/>
  </alt>
 </segment>
</mediaObject>
</par>
</contents>
```

FIG. 34

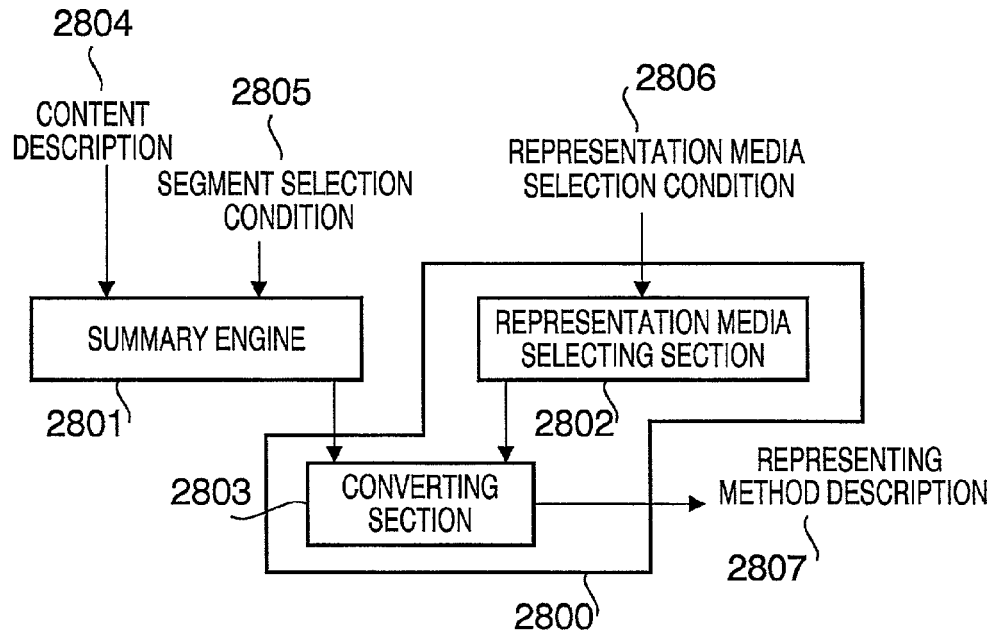

FIG. 35

EXAMPLE OF DTD OF STRUCTURE DESCRIPTION DATA (program4.dtd)

```
<?xml version="1.0"?>
<!ENTITY  %  types      "(audio|video|image|audiovideo|audioimage)">
<!ENTITY  %  formats    "(mpeg1|mpeg2)">

<!ELEMENT  contents    (par|mediaObject)+>
<!ATTLIST  contents    tite    CDATA   #REQUIRED>
<!ELEMENT  par         (mediaObject+)>
<!ELEMENT  mediaObject (segment)>
<!ATTLIST  mediaObject type    %types;    "audiovideo"
                       format  %formats;  #REQUIRED
                       src     CDATA      #REQUIRED>
<!ELEMENT  segment     (pointOfView*)>    }3601
<!ATTLIST  segment     start   CDATA      #REQUIRED
                       end     CDATA      #REQUIRED>
<!ELEMENT  pointOfView EMPTY>
<!ATTLIST  pointOfView viewpoint  CDATA    #REQUIRED  }3602
                       score      NMTOKEN  #REQUIRED>
```

FIG. 36

EXAMPLE OF XML DOCUMENT OF STRUCTURE DESCRIPTION DATA

```
<?xml version="1.0"?>
<!DOCTYPE contents SYSTEM"http://mserv.com/DTD/program4.dtd">

<contents title="Movie etc.">
<mediaObject type="audiovideo"format="mpeg1"src="http://mserv.com/MPEG/movie0v.mpg" >
    <segment start="00:00:00"end="00:01:00">
        <pointOfView viewPoint="pov0"score="1"/>
        <pointOfView viewPoint="pov1"score="1"/>
    </segment>
    <segment start="00:01:00"end="00:02:00">
        <pointOfView viewPoint="pov0"score="5"/>
    </segment>
    <segment start="00:02:00"end="00:03:00">
        <pointOfView viewPoint="pov1"score="5"/>
    </segment>
    <segment start="00:03:00"end="00:04:00">
        <pointOfView viewPoint="pov0"score="3"/>
        <pointOfView viewPoint="pov1"score="4"/>
    </segment>
    <segment start="00:04:00"end="00:05:00">
        <pointOfView viewPoint="pov0"score="2"/>
    </segment>
</mediaObject>
</contents>
```

FIG. 37

EXAMPLE OF XML DOCUMENT OF STRUCTURE DESCRIPTION DATA

```
<?xml verslon="1.0"?>
<!DOCTYPE contents SYSTEM"http://mserv.com/DTD/program4.dtd">

<contents title="Movie etc.">
  <par>
    <mediaObject type="video"format="mpeg1"src="http://mserv.com/MPEG/movie0v.mpv">
      <segment start="00:00:00"end="00:01:00">
        <pointOfView viewPoint="pov0"score="1"/>
        <pointOfView viewPoint="pov1"score="1"/>
      </segment>
      <segment start="00:01:00"end="00:02:00">
        <pointOfView viewPoint="pov0"score="5"/>
      </segment>
      <segment start="00:02:00"end="00:03:00">
        <pointOfView viewPoint="pov1"score="5"/>
      </segment>
      <segment start="00:03:00"end="00:04:00">
        <pointOfView viewPoint="pov0"score="3"/>
        <pointOfView viewPoint="pov1"score="4"/>
      </segment>
      <segment start="00:04:00"end="00:05:00">
        <pointOfView viewPoint="pov0"score="2"/>
      </segment>
    </mediaObject>
    <mediaObject type="audio"format="mpeg1"src="http://mserv.com/MPEG/movie0a.mp2">
      <segment start="00:00:00"end="00:01:00">
        <pointOfView viewPoint="pov0"score="1"/>
        <pointOfView viewPoint="pov1"score="1"/>
      </segment>
      <segment start="00:01:00"end="00:02:00">
        <pointOfView viewPoint="pov0"score="5"/>
      </segment>
      <segment start="00:02:00"end="00:03:00">
        <pointOfView viewPoint="pov1"score="5"/>
      </segment>
      <segment start="00:03:00"end="00:04:00">
        <pointOfView viewPoint="pov0"score="3"/>
        <pointOfView viewPoint="pov1"score="3"/>
      </segment>
      <segment start="00:04:00"end="00:05:00">
        <pointOfView viewPoint="pov0"score="2"/>
      </segment>
    </mediaObject>
  </par>
</contents>
```

FIG. 39

EXAMPLE OF DTD OF STRUCTURE DESCRIPTION DATA (program5.dtd)

```
<?xml version="1.0"?>
<!ENTITY %  types      "(audio|video|image|audiovideo|audioimage)">
<!ENTITY %  formats    "(mpeg1|mpeg2|gif|jpeg)">

<!ELEMENT   contents    (par|mediaObject)+>
<!ATTLIST   contents    tite   CDATA  #REQUIRED>
<!ELEMENT   par         (mediaObject+)>
<!ELEMENT   mediaObject (segment)>
<!ATTLIST   mediaObject type    %types;    "audiovideo"
                        format  %formats;  #REQUIRED
                        src     CDATA      #REQUIRED>
<!ELEMENT   segment     (alt*)>
<!ATTLIST   segment     start   CDATA   #REQUIRED
                        end     CDATA   #REQUIRED>
<!ELEMENT   alt         (pointOfView*,pos?)>
<!ATTLIST   alt         type    %types;     #REQUIRED
                        format  %formats;   #REQUIRED
                        src     CDATA       #REQUIRED>
<!ELEMENT   pointOfView EMPTY>
<!ATTLIST   pointOfView viewpoint CDATA   #REQUIRED
                        score     NMTOKEN #REQUIRED>
<!ELEMENT   pos         EMPTY>
<!ATTLIST   pos         start   CDATA  #REQUIRED
                        end     CDATA  #REQUIRED>
```
} 4101

FIG. 41

EXAMPLE OF XML DOCUMENT OF STRUCTURE DESCRIPTION DATA

```
<?xml verslon="1.0"?>
<!DOCTYPE contents SYSTEM"http://mserv.com/DTD/program5.dtd">

<contents title="Movie etc.">
  <mediaObject type="audiovideo"format="mpeg1"src="http://mserv.com/MPEG/movie0.mpg">
    <segment start="00:00:00"end="00:01:00">
      <pointOfView viewPoint="pov0"score="1"/>
      <pointOfView viewPoint="pov1"score="1"/>
      <alt type="image"format="jpeg"src="http://mserv.com/Image/s0.jpg">
      </alt>
      <alt type="audio"format="mpeg1"src="http://mserv.com/MPEG/movie0a.mp2">
        <pos start="00:00:00"end="00:01:00"/>
      </alt>
    </segment>
    <segment start="00:01:00"end="00:02:00">
      <pointOfView viewPoint="pov0"score="5"/>
      <alt type="image"format="jpeg"src="http://mserv.com/Image/s1.jpg">
      </alt>
      <alt type="audio"format="mpeg1"src="http://mserv.com/MPEG/movie0a.mp2">
        <pos start="00:01:00"end="00:01:30"/>
      </alt>
    </segment>
    <segment start="00:02:00"end="00:03:00">
      <pointOfView viewPoint="pov1"score="5"/>
      <alt type="image"format="jpeg"src="http://mserv.com/Image/s2.jpg">
      </alt>
      <alt type="audio"format="mpeg1"src="http://mserv.com/MPEG/movie0a.mp2">
        <pos start="00:02:00"end="00:03:00"/>
      </alt>
    </segment>
    <segment start="00:03:00"end="00:04:00">
      <pointOfView viewPoint="pov0"score="3"/>
      <pointOfView viewPoint="pov1"score="4"/>
      <alt type="image"format="jpeg"src="http://mserv.com/Image/s3.jpg">
      </alt>
      <alt type="audio"format="mpeg1"src="http://mserv.com/MPEG/movie0a.mp2">
        <pos start="00:03:00"end="00:03:30"/>
      </alt>
    </segment>
    <segment start="00:04:00"end="00:05:00">
      <pointOfView viewPoint="pov0"score="2"/>
      <alt type="image"format="jpeg"src="http://mserv.com/Image/s4.jpg">
      </alt>
      <alt type="audio"format="mpeg1"src="http://mserv.com/MPEG/movie0a.mp2">
        <pos start="00:04:00"end="00:05:00"/>
      </alt>
    </segment>
  </mediaObject>
</contents>
```

FIG. 42

EXAMPLE OF XML DOCUMENT OF STRUCTURE DESCRIPTION DATA

```
<?xml version="1.0"?>
<!DOCTYPE contents SYSTEM"http://mserv.com/DTD/program5.dtd">
<contents title="Movie etc.">
<par>
  <mediaObject type="video"format="mpeg1"src="http://mserv.com/MPEG/movie0v.mpv">
    <segment start="00:00:00"end="00:01:00">
      <pointOfView viewPoint="pov0"score="1"/>
      <pointOfView viewPoint="pov1"score="1"/>
      <alt type="image"format="jpeg"src="http://mserv.com/image/s0.jpg">
      </alt>
    </segment>
    <segment start="00:01:00"end="00:02:00">
      <pointOfView viewPoint="pov0"score="5"/>
      <alt type="image"format="jpeg"src="http://mserv.com/image/s1.jpg">
      </alt>
    </segment>
    <segment start="00:02:00"end="00:03:00">
      <pointOfView viewPoint="pov1"score="5"/>
      <alt type="image"format="jpeg"src="http://mserv.com/image/s2.jpg">
      </alt>
    </segment>
    <segment start="00:03:00"end="00:04:00">
      <pointOfView viewPoint="pov0"score="3"/>
      <pointOfView viewPoint="pov1"score="4"/>
      <alt type="image"format="jpeg"src="http://mserv.com/image/s3.jpg">
      </alt>
    </segment>
    <segment start="00:04:00"end="00:05:00">
      <pointOfView viewPoint="pov0"score="2"/>
      <alt type="image"format="jpeg"src="http://mserv.com/image/s4.jpg">
      </alt>
    </segment>
  </mediaObject>
</par>
```

FIG. 43

```
<mediaObject type="audio" format="mpeg1" src="http://mserv.com/MPEG/movie0a.mp2">
<segment start="00:00:00" end="00:01:00" score="1">
  <pointOfView viewPoint="pov0" score="1"/>
  <pointOfView viewPoint="pov1" score="1"/>
  <alt type="audio" format="mpeg1" src="http://mserv.com/MPEG/movie0a.mp2">
    <pos start="00:00:00" end="00:01:00"/>
  </alt>
</segment>
<segment start="00:01:00" end="00:02:00">
  <pointOfView viewPoint="pov0" score="5"/>
  <alt type="audio" format="mpeg1" src="http://mserv.com/MPEG/movie0a.mp2">
    <pos start="00:1:00" end="00:02:00"/>
  </alt>
</segment>
<segment start="00:02:00" end="00:03:00">
  <pointOfView viewPoint="pov1" score="5"/>
  <alt type="audio" format="mpeg1" src="http://mserv.com/MPEG/movie0a.mp2">
    <pos start="00:02:00" end="00:03:00"/>
  </alt>
</segment>
<segment start="00:03:00" end="00:04:00">
  <pointOfView viewPoint="pov0" score="3"/>
  <pointOfView viewPoint="pov1" score="3"/>
  <alt type="audio" format="mpeg1" src="http://mserv.com/MPEG/movie0a.mp2">
    <pos start="00:03:00" end="00:03:30"/>
  </alt>
</segment>
<segment start="00:04:00" end="00:05:00">
  <pointOfView viewPoint="pov0" score="2"/>
  <alt type="audio" format="mpeg1" src="http://mserv.com/MPEG/movie0a.mp2">
    <pos start="00:04:00" end="00:05:00"/>
  </alt>
</segment>
</mediaObject>
</par>
</contents>
```

FIG. 44

DATA PROCESSING APPARATUS AND DATA PROCESSING METHOD

BACKGROUND OF THE INVENTION

1. Field of the Invention

The present invention relates to a data processing apparatus and data processing method for converting a description on a structure of media contents into a description for representation of the contents, in order to perform representation and distribution of the contents suitable for user preference and terminal capability in watching and listening, representing, and distributing the media contents that are continuous visual and audio information such as moving picture, image and audio.

2. Description of the Related Art

Conventionally, media contents are stored for each file, and representation and distribution of the media contents are performed for each file storing the media contents.

When the media contents are digitized by a plurality of different systems and are stored in a plurality of files, decoding processing is required in representing the media contents. A processing amount of the decoding processing varies with the digitizing method. Therefore, when the media contents are selected, it is necessary to select the media contents that are digitized by a digitizing method suitable for a processing capability of a terminal that represents the media contents. In this case, a user selects for each file the media contents suitable for the capability of a terminal that the user uses, and thereby selects the media contents to be displayed according to the capability of the terminal device.

As a method for representing only a specific scene in a moving picture distribution using World Wide Web, there is known a method described in Japanese Laid-Open Patent Publication HEI10-111872. FIG. 50 illustrates a configuration of a moving picture distributing apparatus described in Japanese Laid-Open Patent Publication HEI10-111872, which will be described below.

In the moving picture distributing apparatus, scene information inputting section 3903 inputs in advance a scene number, time codes of start/end frames, key word relating to a scene, and moving picture file name to scene information storing section 3904. Using a retrieval condition input from scene information inputting section 3903, scene retrieving section 3905 retrieves scene information stored in scene information storing section 3904. Scene retrieving section 3905 extracts the scene number of a retrieved desired scene to store as a scenario in scenario storing section 3907.

Scenario editing section 3908 changes the order of extracted scenes and deletes an unnecessary scene when necessary. Moving picture transferring section 3909 transfers moving picture data stored in moving picture file storing section 3902, in the order of the scene number stored as the scenario that is edited by scenario editing section 3908, to represent. Moving file storing section 3902 receives as its input a moving picture from moving picture file inputting section 3901.

However, in the conventional method for representing the contents for each file, the contents with files stored therein should be all represented. Accordingly, it is impossible to see an outline that is a summary of the contents. Another problem is that it is required to refer to the contents starting from the first portion even in retrieving a highlight scene composed of extracted part of the contents or retrieving a scene that a user wants to watch.

Further, according to the method of Japanese Laid-Open Patent Publication HEI10-111872, since it is possible to designate the representation order of scene cut, it is not required to refer to the contents starting from the first portion. However, this method only provides the order of representing scenes as the scenario, and does not provide processing except rearranging the order of representing scenes. Accordingly, there arise a problem that it is not possible to perform complicated representation, such as, representing a plurality of media in relation to each other.

SUMMARY OF THE INVENTION

It is an object of the present invention to generate representation description data for representing media segments described in structure description data while adding various restrictions from the structure description data expressive of a structure of the media contents.

In order to achieve the object, in the present invention, from the structure description data with the structure of media contents described therein is generated the representation description data expressive of the representation order, representation timing and synchronization information of media segments described in the structure description data.

Thus, a few media segments are selected from the structure description data to be converted into the representation description data expressive of the representation order, representation timing and synchronization information of the media segments, whereby it is possible to obtain display aspects of an outline, highlight scenes, and a scene collection suiting user's preference. Further, by providing the representation description data with the representation order, representation timing and synchronization information, it is possible to relate a plurality of media to each other to represent data.

Further in the present invention, the structure description data is provided with a set of alternative data to media segments, and is converted into the representation description data expressive of the representation order, representation timing and synchronization information of at least one of the media segments or the alternative data.

It is thereby possible to switch between the media segments and alternative data to represent corresponding to a capacity and traffic amount of a network that distributes the media contents and a capability of a terminal that represents the media contents. In other words, it is possible to distribute and represent the contents using media suitable for, for example, the capability of a terminal that represents the contents.

Furthermore in the present invention, a media selecting section is provided that selects the media segments or alternative data to represent in representing the media segments expressed in the structure description data.

The media segments or alternative data is thereby capable of being automatically selected by the media selecting section corresponding to the capability of a terminal, without a user selects the media segments or alternative data corresponding to the capability of a terminal.

Still furthermore in the present invention, in the structure description data is described a score based on context contents of each media segment.

It is thereby possible to generate, for example, highlight scene collections with different representation time periods, and to represent and distribute the collections easily. Further, setting a score based on a viewpoint indicated by a keyword enables designating the keyword to represent and distribute only scenes suiting user's preference.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 2A is a diagram illustrating DTD of structure description data in the first embodiment;

FIG. 2B is a diagram illustrating an example of the structure description data in the first embodiment;

FIG. 3 is a diagram illustrating another example of the structure description data in the first embodiment;

FIG. 7 is a diagram illustrating an example of the representation description data in the first embodiment;

FIG. 8 is a diagram illustrating an example of the representation description data in the first embodiment;

FIG. 10 is a diagram illustrating an example of the representation description data in the first embodiment;

FIG. 11 is a diagram illustrating an example of the representation description data in the first embodiment;

FIG. 12 is a diagram illustrating an example of the representation description data in the first embodiment;

FIG. 13 is a diagram illustrating DTD of the structure description data in a second embodiment of the present invention;

FIG. 14 is a diagram illustrating an example of the structure description data in the second embodiment;

FIG. 15 is a diagram illustrating another example of the structure description data in the second embodiment;

FIG. 17 is a diagram illustrating an example of the representation description data in the second embodiment;

FIG. 20 is a diagram illustrating an example of the representation description data in the third embodiment;

FIG. 21A is a diagram illustrating DTD of extension of the structure description data in the third embodiment;

FIG. 21B is a diagram illustrating an example of extension of the structure description data in the third embodiment;

FIG. 22 is a block diagram of a data processing apparatus according to a fourth embodiment of the present invention;

FIG. 23 is a diagram illustrating DTD of the structure description data in the fourth embodiment;

FIG. 24 is a diagram illustrating an example of the structure description data in the fourth embodiment;

FIG. 26 is a diagram illustrating an example of an intermediate type of structure description data in the fourth embodiment;

FIG. 27 is a diagram illustrating an example of the structure description data in a fifth embodiment of the present invention;

FIG. 29 is a diagram illustrating an example of an intermediate type of structure description data in the fifth embodiment;

FIG. 30 is a diagram illustrating DTD of the structure description data in a sixth embodiment of the present invention;

FIG. 31 is a diagram illustrating an example of the structure description data in the sixth embodiment;

FIG. 32 is a diagram illustrating an example of an intermediate type of structure description data in the sixth embodiment;

FIG. 33 is a diagram illustrating an example of the structure description data in a seventh embodiment of the present invention;

FIG. 34 is a diagram illustrating an example of an intermediate type of structure description data in the seventh embodiment;

FIG. 35 is a block diagram of a data processing apparatus according to an eighth embodiment of the present invention;

FIG. 36 is a diagram illustrating DTD of the structure description data in a tenth embodiment of the present invention;

FIG. 37 is a diagram illustrating an example of the structure description data in the tenth embodiment;

FIG. 39 is a diagram illustrating an example of the structure description data in an eleventh embodiment of the present invention;

FIG. 41 is a diagram illustrating DTD of the structure description data in a twelfth embodiment of the present invention;

FIG. 42 is a diagram illustrating an example of the structure description data in the twelfth embodiment of the present invention;

FIG. 43 is a first diagram illustrating an example of the structure description data in a thirteenth embodiment of the present invention;

FIG. 44 is a second diagram illustrating an example of the structure description data in the thirteenth embodiment of the present invention;

DETAILED DESCRIPTION OF THE PREFERRED EMBODIMENTS

First Embodiment

Figure 1:
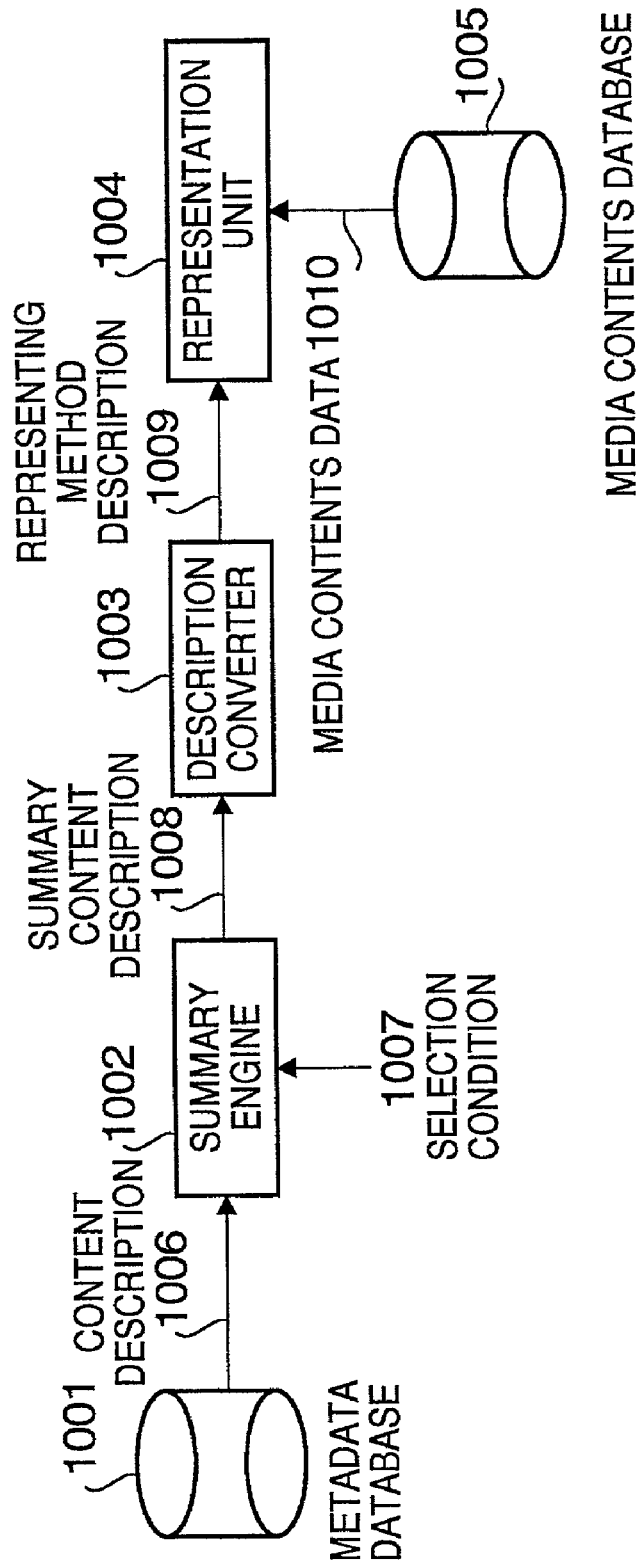
FIG. 1 is a conceptual diagram of a data processing system according to a first embodiment of the present invention.

The first embodiment of the present invention will be described below with reference to accompanying drawings. A structure of a data processing system according to the first embodiment of the present invention will be described first with reference to FIG. 1. FIG. 1 is a conceptual diagram of the data processing system according to the first embodiment.

The data processing system according to the first embodiment is composed of metadata database 1001, summary engine 1002, description converter 1003, representation unit 1004, and media contents database 1005. In FIG. 1, "1006" denotes a content description that is metadata, "1007" denotes a selection condition, "1008", denotes a summary content description that is a summary result, "1009" denotes a representing method description for providing an instruction to representation unit 1004, and "1010" denotes media contents data.

The metadata is data indicative of additional information on media contents including bibliographic items such as a title and date and time of creation, contents, and scene structure of the media contents. Database 1001 is indicative of a database of such metadata.

Summary engine 1002 receives as its input content description 1006 that is structure description data expressive of the contents and structure of the media contents from among metadata stored in database 1001. Summary engine 1002 selects only scenes suitable for selection condition 1007 inputted by a user from the input content description 1006. Summary engine 1002 generates summary content description 1008 with only data left associated with the scenes selected from content description 1006 and with the other data deleted to output.

Content description 1006 and summary content description 1008 are structure description data expressive of the contents and structure of media contents, and have a different number of described scenes from each other and the same format as the other.

Description converter 1003 receives as its input summary content description 1008, and generates and outputs representing method description 1009 that is representation description data in which representation aspects of media are described such as the representation order, timing for starting the representation and synchronization information in representing a scene described in summary content description 1008.

Representation unit 1004 receives as its inputs representing method description 1009, and according to representing method description 1009, media contents data 1010 that is data to be represented from media contents database 1005. Then, representation unit 1004 represents media contents data 1010 according to the representation order, timing for starting the representation, synchronization information, etc. described in representing method description 1009.

Since summary content description 1008 and content description 1006 have the same format, description converter 1003 is capable of similarly generating a representing method description (representation description data) corresponding to content description 1006.

The structure description data used in content description 1006 and summary content description 1008 will be described next with reference to FIGS. 2A, 2B and 3.

FIG. 2A illustrates Document Type Definition (DTD) that is a definition for describing the structure description data with XML. FIG. 2B illustrates an example of the structure description data corresponding to the media contents with multiplexed moving picture and audio using MPEG 1 as an example. FIG. 3 illustrates an example of the structure description data of the media contents with moving picture and audio in different media.

In this embodiment, Extensible Markup Language (XML) is used as an example of the aspect for expressing the structure description data on a computer.

XML is a data description language standardized by World Wide Web Consortium (W3C), and Ver.1.0 thereof was recommended on Feb. 10, 1998. The specification of XML ver.1.0 is available at http://www.w3.org/TR/REC-xml.

Using FIG. 2A, Document Type Definition (DTD) that is a definition for describing the structure description data with XML will be first described.

As illustrated by "201" in the figure, a "contents" element is composed of a "par" element and a "mediaObject" element. Further as illustrated by "202" in the figure, the "contents" element has a "title" attribute indicated by character data.

The "mediaObject" element is expressive of media. As illustrated by "203", in the figure, the "par" element is composed of a plurality of "mediaObject" elements each is a child element. When the "contents" element is composed of a plurality of "mediaObject" elements such as audio and video, the "par" element is expressive of synchronizing a plurality of "mediaObject" elements as child elements with each other to represent.

As illustrated by "204" in the figure, the "mediaObject" element is composed of a "segment" element expressive of a media segment. As illustrated by "205" in the figure, in the "mediaObject" element a type of media is designated by a "type" attribute. In this example, examples designated as the type of media are "audio" that is audio information, "video" that is moving picture information, "image" that is still picture information, "audiovideo" that is multiplexed audio and moving picture information, and "audioimage" that is audio and still picture information. When the "type" attribute is not designated in particular, the "type" attribute is set to "audiovideo" as default.

As illustrated by "206" in the figure, in the "mediaObject" element a format of media such as MPEG1 and MPEG2 is designated by a "format" attribute. As illustrated by "207" in the figure, in the "mediaObject" element a location where data is stored is designated by an "src" attribute. Designating Uniform Resource Locator (URL) by the "src" attribute enables the designation of a location where the data is stored.

As illustrated by "208" in the figure, the "segment" element has a "start" attribute and "end" attribute. The "start" and "end" attributes are respectively indicative of a start time and end time of the "segment" element. The "start" and "end" attributes each indicate a time inside the media designated by the "mediaObject" element. In other words, by the "start" and "end" attributes, the "segment" element is assigned to a corresponding portion of the media designated by the "mediaObject" element.

In addition, in this embodiment, the time information on the media segment is designated by a pair of start time and end time, however, such time information may be expressive of a pair of start time and duration.

An example of the structure description data for media contents with multiplexed moving picture and audio will be described below using MPEG 1 as an example with reference to FIG. 2B.

In the structure description data illustrated in FIG. 2B, a title of "Movie etc" is designated in the "contents" element. In the "mediaObject" element, "audiovideo" is designated as the type, MPEG1 is designated as the format, and http://mserv.com/MPEG/movie0.mpg is designated as the storing location. The "mediaObject" element has the "segment" element with the time information of time 00:00:00 to 00:01:00, the "segment" element with the time information of time 00:01:00 to 00:02:00, the "segment" element with the time information of time 00:03:00 to 00:04:00, and the "segment" element with the time information of time 00:04:00 to 00:05:00. In other words, the "mediaObject" element is indicative of a description without time 00:02:00 to 00:03:00.

An example of the structure description data of media contents with moving picture and audio in different media will be described below using FIG. 3.

In the structure description data illustrated in FIG. 3, a title of "Movie etc" is designated in the "contents" element. In the example of FIG. 3, the "contents" element is composed of the "mediaObject" element with the type of "video" and the "mediaObject" element with the type of "audio". Accordingly, by the "par" element, the "mediaObject" element of "video" type is synchronized with the "mediaObject" element of "audio" type.

In the element "mediaObject" of "video" type, MPEG 1 is designated as the format, and http://mserv.com/MPEG/movie0v.mpv is designated as the storing location.

The "mediaObject" element of "video" type has the "segment" element with the time information of time 00:00:00 to 00:01:00, the "segment" element with the time information of time 00:01:00 to 00:02:00, the "segment" element with the time information of time 00:03:00 to 00:04:00, and the "segment" with the time information of time 00:04:00 to 00:05:00. In other words, the "mediaObject" element of "video" type is indicative of a description without time 00:02:00 to 00:03:00.

In the "mediObject" element of "audio" type, MPEG 1 is designated as the format, and http://mserv.com/MPEG/movie0a.mp2 is designated as the storing location. The "mediaObject" element of "audio" type has the segment with the time information of time 00:00:00 to 00:01:00, the segment with the time information of time 00:01:00 to 00:02:00, the segment with the time information of time 00:03:00 to 00:04:00, and the segment with the time information of time 00:04:00 to 00:05:00. In other words, the "mediaObject" element of "audio" type is indicative of a description without time 00:02:00 to 00:03:00.

When the contents are composed of a plurality of media, it is necessary to control representation timing and synchronization between media segments. Then in this embodiment, description converter 1003 converts summary content description 1008 described with the structure description data into representing method description 1009 described with representation description data capable of expressing the representation order, representation timing and synchronization information of media segments.

In this embodiment, Synchronized Multimedia Integration Language (SMIL) is used as the representation description data. SMIL is a description language standardized by W3C for the purpose of describing timewise behavior of representation and layout on a display screen with respect to a plurality of media. Ver.1.0 of SMIL was recommended on Jun. 15, 1998. The specification of SMIL ver.1.0 is available at http://www.w3.org/TR/REC-smil.

Thus using standardized SMIL as the representation description data enables the use of preexisting and/or developing SMIL player programs, and therefore increases the generality.

Figure 4:
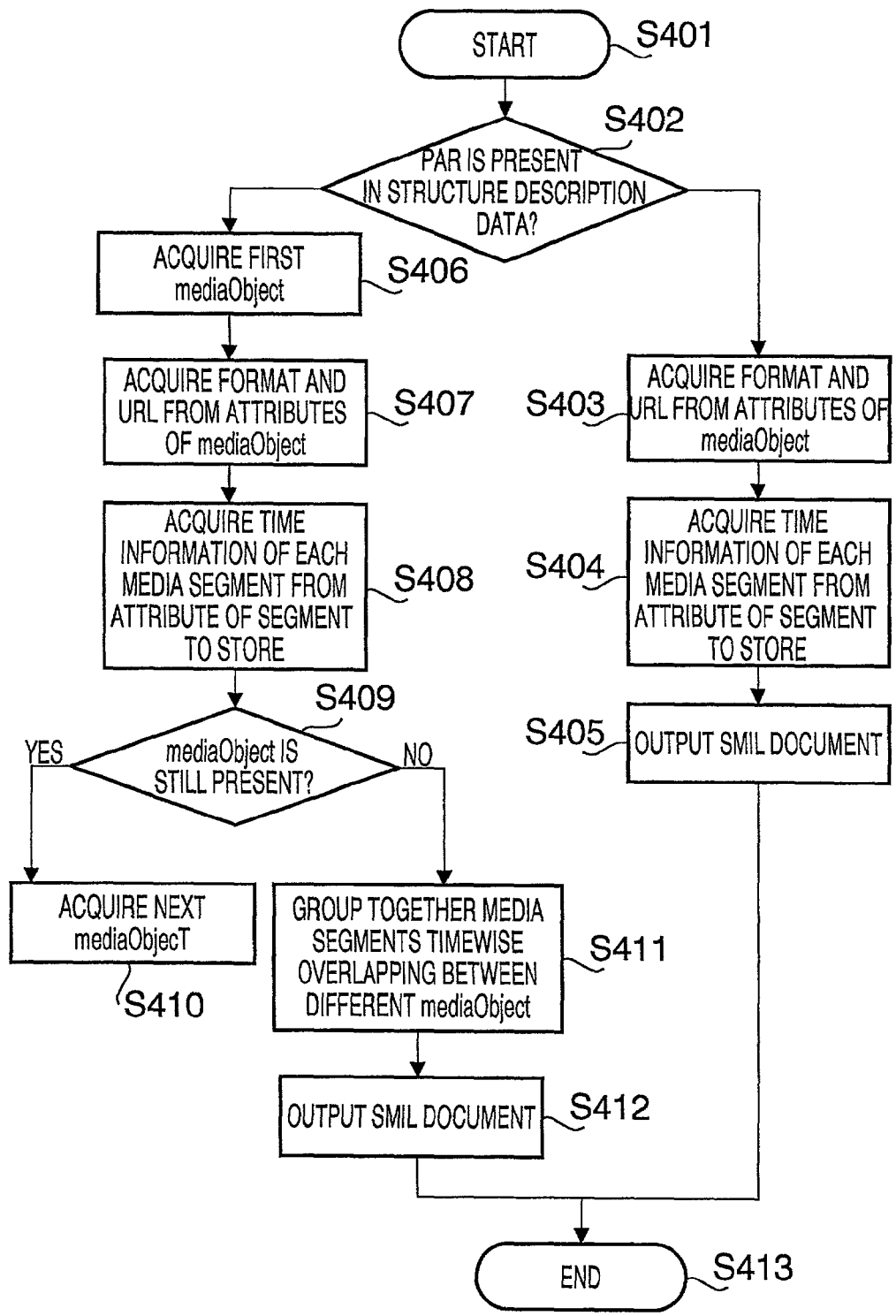
FIG. 4 is a flowchart for converting the structure description data into representation description data in the first embodiment.

With reference to FIG. 4, the processing will be described below for converting the structure description data described with XML into the representation description data expressive of representation aspects such as the representation order, representation timing and synchronization information of media segments. FIG. 4 is a flowchart indicative of procedures for the description converter according to the first embodiment to convert the structure description data into SMIL.

When the processing is started (step S401), at step S402, description converter 1003 examines whether or not the "par" element is present in summary content description 1008 described with the structure description data. When description converter 1003 judges at step S402 that the "par" element is present, the converter shifts to the processing of step S406, while when the converter judges at step S402 that the "par" element is not present, the converter shifts to the processing of step S403.

At step 5403, description converter 1003 acquires, in the "mediaObject" element of summary content description 1108 described with the structure description data, a type of the media from the "type" attribute, format of the media from the "format" attribute, and URL of the media data from the "src" attribute. Description converter 1003 next functions as an analyzer by acquiring at step S404 the time information of a media segment from the "start" attribute and "end" attribute of each "segment" element to store. The converter 1003 generates at step 5405 representing method description 1009 described with the SMIL document using the format of the media, URL of the media data, and time information of media segments acquired at steps 5403 and 5404 to output.

Meanwhile, description converter 1003 acquires at step S406 the "mediaObject" element at the head of the "par" element. The converter 1003 next acquires at S407 in the acquired "mediaObject" element a type of the media from the "type" attribute, format of the media from the "format" attribute, and URL of the media data from the "src" attribute. The converter 1003 next acquires at step S408 the time information of a media segment from the "start" attribute and "stop" attribute of each "segment" element to store.

Description converter 1003 examines at step S409 whether or not a "mediaObject" element that has not been examined is still present in the "par" element. When there is a "mediaObject" element that has not been examined, the converter 1003 acquires the first one at step S410, and shifts to the processing of step S407. Meanwhile when there is no "mediaObject" element that has not been examined, the converter 1003 shifts to the processing of step S411.

At step S411, description converter 1003 groups together segments belonging to different "mediaObject" elements and overlapping timewise using the stored time information of the "segment" elements. Then the converter 1003 generates at step S412 representing method description 1009 described with the SMIL document using the format of the media, URL of the media data, and time information of media segments acquired at steps S407 and S408 to output.

Figures 5, 6:
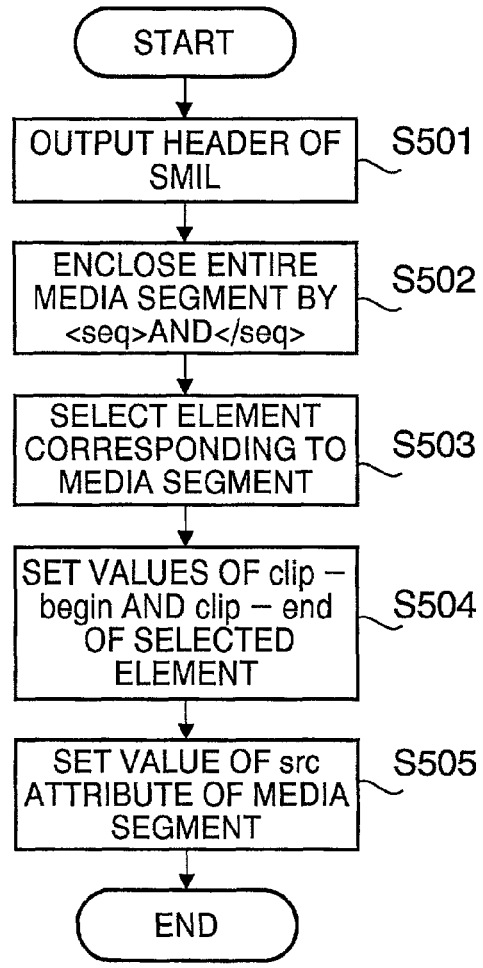
FIG. 5 is a flowchart for a description converter according to the first embodiment to output a representing method description that is an SMIL document from a summary content description that is the structure description data.
FIG. 6 is a diagram illustrating a structure of the SMIL document.

With reference to FIG. 5, the processing at step S405 will be described below where when summary content description 1008 of structure description data does not has the "par" element, description converter 1003 outputs representing method description 1009 of SMIL document from summary content description 1008. FIG. 5 is a flowchart for the description converter according to the first embodiment to output the representing method description that is the SMIL document from the summary content description that is the structure description data.

First, description converter 1003 outputs a header of SMIL (step S501).

The SMIL document is, as illustrated in FIG. 6, composed of header 601 and body 602. Header 601 is described in a "head" element, while body 602 is described in a "body" element. That is, header 601 is indicated by a portion enclosed by <head> and </head>, while body 602 is indicated by a portion enclosed by <body> and </body>.

Examples described in the header are information such as a creator and creation data, and layout such as where to display an image and text on a screen. The header is capable of being omitted.

Description converter 1003 encloses the entire media segments by <seq> and </seq> (step S502). These are "seq" elements, and are indicative of representing or displaying the media segments enclosed by <seq> </seq> in the order in which the segments are described.

Description converter 1003 next performs the following processing for each of the media segments enclosed by <seq> </seq>.

First, according to the media type, description converter 1003 selects a corresponding element from the "audio" element, "video" element, "ref" element and "img" element of SMIL. (step S503). In addition, the "ref" element is defined as a description not to specify media of a source. The "ref" element is assigned either of audio, moving picture, still picture and multiplexed moving picture and audio.

Description converter 1003 next sets values of a "clip-begin" attribute and "clip-end" attribute of the element selected at step S503 as described below. That is, description converter 1003 sets values of the "clip-begin" attribute and "clip-end" attribute of SMIL respectively at a value of the "start" attribute and a value of the "end" attribute of the corresponding "segment" element of summary content description 1008 (step S504). In addition, "clip" is indicative of a timewise interval.

Description converter 1003 next sets a value of the "src" attribute of the element selected at step S503 at a value of the "src" attribute of the "mediaObject" element that is a parent element of the corresponding "segment" element of summary content description 1008. Then, the converter 1003 outputs the description of the element selected at step S503.

Thus, description converter 1003 generates representing method description 1009 that is representation description data written in SMIL from summary content description 1008 that is the structure description data.

FIG. 7 illustrates the SMIL document that description converter 1003 outputs from the structure description data illustrated in FIG. 2B. FIG. 7 is a diagram illustrating an example of the SMIL document that the description converter according to the first embodiment outputs.

In the example of document illustrated in FIG. 5, the processing is performed to the information of time 00:00:00 to 00:01:00 of http://mserv.com/MPEG/movie0.mpg, the information of time 00:00:01 to 00:02:00 of http://mserv.com/MPEG/movie0.mpg, the information of time 00:03:00 to 00:04:00 of http://mserv.com/MPEG/movie0.mpg, and the information of time 00:04:00 to 00:05:00 of http://mserv.com/MPEG/movie0.mpg in this order. In addition, in the example illustrated in FIG. 7, a header is omitted.

It may be also possible to add processing for putting together timewise successive clips into one to output the SMIL document illustrated in FIG. 8.

In the example of document illustrated in FIG. 8, the processing is performed to the information of time 00:00:00 to 00:02:00 of http://mserv.com/MPEG/movie0.mpg, and the information of time 00:03:00 to 00:05:00 of http://mserv.com/MPEG/movie0.mpg in this order. In other wise, the document illustrated in FIG. 8 is to execute the same processing as in the example of document illustrated in FIG. 7.

Figure 9:
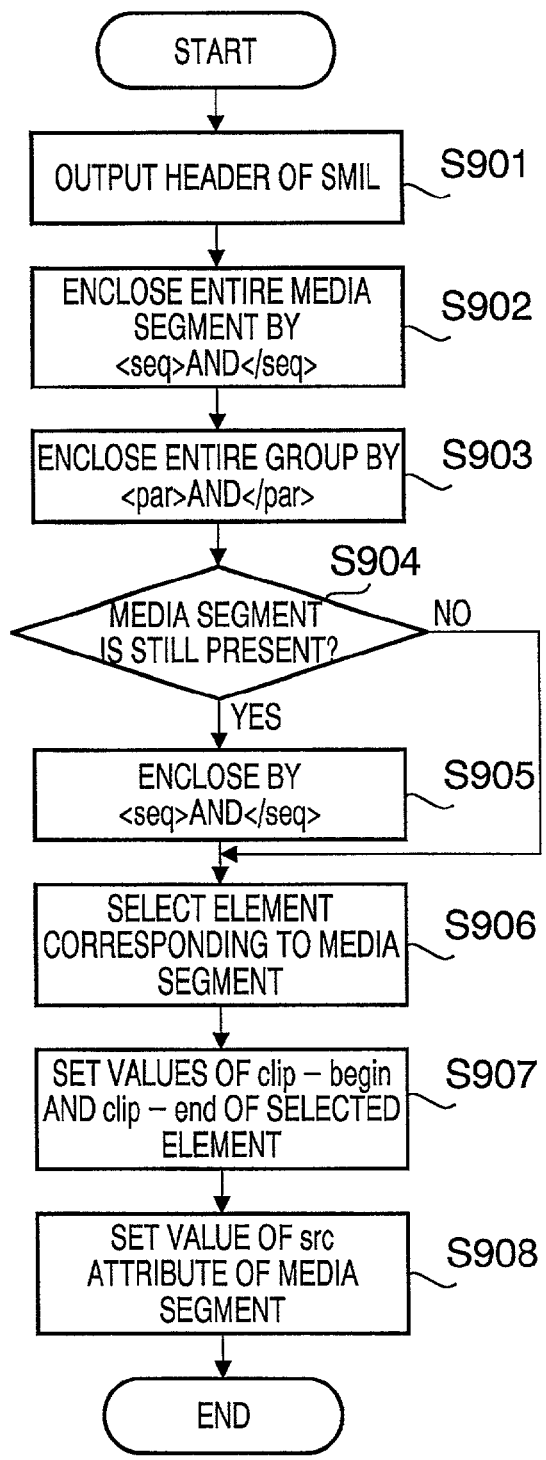
FIG. 9 is a flowchart for the description converter according to the first embodiment to output a representing method description that is the SMIL document from a summary content description that is the structure description data.

With reference to FIG. 9, the processing of step S412 will be described below that description converter 1003 outputs representing method description 1009 that is the SMIL document from summary content description 1008 when summary content description 1008 that is the structure description data has the "par" element. FIG. 9 is a flowchart for the description converter according to the first embodiment to output the representing method description that is the SMIL document from the summary content description that is the structure description data.

Description converter 1003 first outputs a header of SMIL (step S901). The converter 1003 next encloses the entire media segments with <seq> an </seq> (step S902). Then the converter 1003 encloses a group of media segment by <par> and </par> of SMIL in the order in which the time is fast (step S903).

Description converter 1003 next judges whether there is another media segment belonging to the same "mediaObject" element (step S904), and when there is another media segment, encloses it by <seq> and </seq> (step S905). Then, the converter 1003 performs the following processing for each media segment enclosed by <seq> and </seq>.

First, according to the media type, description converter 1003 selects a corresponding element from the "audio" element, "video" element, "ref" element and "img" element and so on of SMIL (step S906). The converter 1003 next sets values of the "clip-begin" attribute and "clip-end" attribute of the selected element. That is, the converter 1003 sets values of the "clip-begin" attribute and "clip-end" attribute of SMIL respectively at a value of the "start" attribute and a value of the "end" attribute of the corresponding "segment" element of summary content description 1008 (step S907). The converter 1003 next sets a value of the "src" attribute of the selected element at a value of the "src" attribute of the "mediaObject" element that is a parent element of the corresponding "segment" element of summary content description 1008 (step S908). Then, the converter 1003 outputs the description of the selected element.

Meanwhile, when there is no media segment belonging to the same "mediaObject" element, description converter 1003 does not perform the processing of enclosing by <seq> and </seq>, and performs the same processing as the above-described processing performed for each media segment.

Thus, even when summary content description 1008 of structure description data is composed of a plurality of media, description converter 1003 generates representing method description 1009 of representation description data for processing a plurality of media in synchronism with each other.

FIG. 10 illustrates the SMIL document to be output using the structure description data illustrated in FIG. 3. FIG. 10 is a diagram illustrating an example of the SMIL document that the description converter according to the first embodiment outputs.

In the example of document illustrated in FIG. 10, the processing is performed for synchronizing the information of time 00:00:00 to 00:01:00 of http://mserv.com/MPEG/movie0v.mpv that is video and the information of time 00:00:

00 to 00:01:00 of http://mserv.com/MPEG/movie0a.mp2 that is audio, synchronizing the information of time 00:01:00 to 00:02:00 of http://mserv.com/MPEG/movie0v.mpv that is video and the information of time 00:01:00 to 00:02:00 of http://mserv.com/MPEG/movie0a.mp2 that is audio, synchronizing the information of time 00:03:00 to 00:04:00 of http://mserv.com/MPEG/movie0v.mpv that is video and the information of time 00:03:00 to 00:04:00 of http://mserv.com/MPEG/movie0a.mp2 that is audio, synchronizing the information of time 00:04:00 to 00:05:00 of http://mserv.com/MPEG/movie0v.mpv that is video and the information of time 00:04:00 to 00:05:00 of http://mserv.com/MPEG/movie0a.mp2 that is audio, and further processing the synchronized information in the order in which the information is described.

Further, as illustrated in FIG. 11, it may be possible to output the SMIL document added processing for putting together timewise successive clips into one.

In order to synchronize a plurality of clips in the "par" element of the SMIL document to each other, a case sometimes arises that it is necessary to made a representation start time of a clip differ from a representation start time of another clip. For example, there is considered a case that audio and video are present in different media objects, a clip of video is indicative of an interval at which a person appears, and that a clip of audio is indicative of a speech that the person speaks. In this case, it is necessary to represent the audio starting from a timing at which the person starts speaking, in accordance with a picture of a motion of the mouse of the person included in the video.

In other words, it is necessary to calculate a representation start time of each clip, and to represent the clip when the time reaches the calculated time. In SMIL, for such a purpose, a "begin" attribute indicative of delay information is prepared in the "audio" element, "video" element, "img" element, and "ref" element.

FIG. 12 is a diagram illustrating an example of SMIL document with representation start times made different for each clip. In the document illustrated in FIG. 12, by using the "begin" attribute, with respect to the information of time 00:00:00 to 00:01:00 of http://mserv.com/MPEG/movie0v.mpv that is video, the information of time 00:00:10 to 00:04:00 of http://mserv.com/MPEG/movie0a.mp2 that is audio is delayed by 10 seconds to be represented. Further with respect to the information of time 00:04:00 to 00:05:00 of http://mserv.com/MPEG/movie0v.mpv that is video, the information of time 00:04:15 to 00:05:00 of http://mserv.com/MPEG/movie0a.mp2 that is audio is delayed by 15 seconds to be represented.

By thus shifting the representation times of a plurality of media included in the structure description data using the "begin" attribute, it is possible to acquire the synchronization between the plurality of media.

As described above, according to the first embodiment, it is possible to convert the structure description data expressive of a structure of media contents into representation description data expressive of representation aspects of the media contents. It is thereby possible to generate distribution data suitable for a user's preference and terminal capabilities by processing or selecting properly the structure description data in distributing the media contents.

Further according to the first embodiment, even when the structure description data is composed of a plurality of media, it is possible to acquire the synchronization between the media. The synchronization between the media is also acquired by shifting the representation timing between the plurality of media.

The first embodiment explains the case that description converter 1003 converts the structure description data expressive of a structure of media contents into the representation description data expressive of representation aspects the media contents, however, it may be possible to program the processing that description converter 1003 performs so that a computer reads the program to execute.

Furthermore, it may be possible to store in a storage medium the program for a computer to execute the processing that description converter 1003 performs.

Second Embodiment

The second embodiment is, in order to represent and distribute media content suitable for a terminal capability, to describe media segments and alternative data to those in structure description data, and to convert the structure description data into the representation description data expressive of representation aspects of the media segments or alternative data. It is thereby possible to convert the structure description data with a set of alternative data such as representative image of a media segment of moving picture described therein into the representation description data of the alternative data. The second embodiment will be described below.

FIGS. 13 to 15 are diagrams illustrating examples of the structure description data according to this embodiment. In the second embodiment, Extensible Markup Language (XML) is used as an example of expressing the structure description data on a computer. FIG. 13 illustrates DTD for describing the structure description data with XML. FIG. 14 illustrates an example of the structure description data corresponding to the media contents with multiplexed moving picture and audio using MPEG 1 as an example. FIG. 15 illustrates an example of the structure description data of the media contents with moving picture and audio in different media.

Using FIG. 13, Document Type Definition (DTD) that is a definition for describing the structure description data with XML will be first described.

As illustrated by "1301" in the figure, a "contents" element is composed of a "par" element and a "mediaObject" element. Further as illustrated by "1302" in the figure, the "contents" element has a "title" attribute indicated by character data. As illustrated by "1303" in the figure, the "par" element is composed of a plurality of "mediaObject" elements each is a child element.

As illustrated by "1304" in the figure, the "mediaObject" element is composed of a "segment" element. As illustrated by "1305" in the figure, in the "mediaObject" element a type of media is designated by a "type" attribute. In this example, examples designated as the type of media are "audio" that is audio information, "video" that is moving picture information, "image" that is still picture information, "audiovideo" that is information with multiplexed audio and moving picture, and "audioimage" that is audio and still picture information. When the "type" attribute is not designated in particular, the "type" attribute is set to "audiovideo" as default.

As illustrated by "1306" in the figure, in the "mediaObject" element a format of media such as MPEG1 and MPEG2 is designated for the moving picture, or the format such as gif and jpeg is designated for a still picture, by the "format" attribute. As illustrated by "1307" in the figure, in the "mediaObject" element a location where data is stored is designated by an "src" attribute. Designating Uniform Resource Locator (URL) by the "src" attribute enables the designation of a location where data is stored.

As illustrated by "1308" in the figure, by a "start" attribute, a time inside the media designated by the "mediaObject" element is designated corresponding to the start time of the "segment" element. By an "end" attribute, a time inside the media designated by the "mediaObject" element is designated corresponding to the end time of the "segment" element.

In addition, in this embodiment, the time information on the media segment is designated by a pair of start time and end time, however, such time information may be expressive of a pair of start time and duration.

As illustrated by "1309" in the figure, the "segment" element has an "alt" element. The "alt" element is expressive of alternative data to a corresponding media segment. As illustrated by "1310" in the figure, in the "alt" element a type of media such as image and audio is designated by the "type" attribute. In the "alt" element a format of media such as gif and jpeg is designated for a still picture by the "format" attribute. In the "alt" element a location where data is stored is designated by the "src" attribute.

It is assumed that each segment is capable of being assigned a plurality of "alt" elements, and that in the same media, the plurality of "alt" elements are represented in the order in which the element appears.

The "alt" element has a "pos" element that is a child element. The "alt" element is assigned to a corresponding interval of the data designated by the "src" attribute. The "start" and "end" attributes of the "pos" element respectively indicate the start time and end time inside the media designated by the "src" attribute.

In addition, in this embodiment, the time information is designated by a pair of start time and end time, however, may be expressive of a pair of start time and duration.

An example of structure description data for media contents with multiplexed moving picture and audio will be described below using MPEG 1 as an example with reference to FIG. 14.

In the structure description data illustrated in FIG. 14, a title of "Movie etc" is designated in the "contents" element. In the "mediaObject" element, "audiovideo" is designated as the type, MPEG1 is designated as the format, and http://mserv.com/MPEG/movie0.mpg is designated as the storing location. The "mediaObject" element has the "segment" element with the time information of time 00:00:00 to 00:01:00, the "segment" element with the time information of time 00:01:00 to 00:02:00, the "segment" element with the time information of time 00:03:00 to 00:04:00, and the "segment" element with the time information of time 00:04:00 to 00:05:00. In other words, the "mediaObject" element is indicative of a description without time 00:02:00 to 00:03:00.

The "segment" element with the time information of time 00:00:00 to 00:01:00 is instructed by the "alt" element that is the alternative data to audiovideo. The "segment" element with the time information of time 00:00:00 to 00:01:00 is composed of the "alt" element with the type of "image", the format of "jpeg", and the storing location of http://mserv.com/IMAGE/s0.jpg, and the "alt" element with the type of "audio", the format of "mpeg1", the storing location of http://mserv.com/MPEG/movie0.mp2, and the time information of time 00:00:00 to 00:01:00.

The "segment" element with the time information of time 00:01:00 to 00:02:00 is composed of the "alt" element with the type of "image", the format of "jpeg", and the storing location of http://mserv.com/IMAGE/s1.jpg, and the "alt" element with the type of "audio", the format of "mpeg1", the storing location of http://mserv.com/MPEG/movie0.mp2, and the time information of time 00:01:00 to 00:01:30.

The "segment" element with the time information of time 00:03:00 to 00:04:00 is composed of the "alt" element with the type of "image", the format of "jpeg", and the storing location of http://mserv.com/IMAGE/s3.jpg, and the "alt" element with the type of "audio", the format of "mpeg1", the storing location of http://mserv.com/MPEG/movie0.mp2, and the time information of time 00:03:00 to 00:03:30.

The "segment" element with the time information of time 00:00:40 to 00:05:00 is composed of the "alt" element with the type of "image", the format of "jpeg", and the storing location of http://mserv.com/IMAGE/s4.jpg, and the "alt" element with the type of "audio", the format of "mpeg1", the storing location of http://mserv.com/MPEG/movie0.mp2, and the time information of time 00:04:00 to 00:05:00.

An example of structure description data of media contents with moving picture and audio in different media will be described below using FIG. 15.

In the structure description data illustrated in FIG. 15, a title of "Movie etc" is designated in the "contents" element. In the example of FIG. 15, the "contents" element is composed of the "mediaObject" element with the type of "video" and the "mediaObject" element with the type of "audio". Accordingly, by the "par" element, the "mediaObject" element of "audio" type is synchronized with the "mediaObject" element of "video" type.

In the "mediaObject" element of "video" type, MPEG 1 is designated as the format, and http://mserv.com/MPEG/movie0v.mpv is designated as a storing location. The "mediaObject" element of "video" type has the "segment" element with the time information of time 00:00:00 to 00:01:00, the "segment" element with the time information of time 00:01:00 to 00:02:00, the "segment" element with the time information of time 00:03:00 to 00:04:00, and the "segment" element with the time information of time 00:04:00 to 00:05:00. In other words, the "mediaObject" element of "video" type is indicative of a description without time 00:02:00 to 00:03:00.

The "segment" element with the time information of time 00:00:00 to 00:01:00 is instructed by the "alt" element that is the alternative data to video. The "segment" element with the time information of time 00:00:00 to 00:01:00 is instructed by the "alt" element with the type of "image", the format of "jpeg", and the storing location of http://mserv.com/IMAGE/s0.jpg. The "segment" element with the time information of time 00:01:00 to 00:02:00 is instructed by the "alt" element with the type of "image", the format of "jpeg", and the storing location of http://mserv.com/IMAGE/s1.jpg. The "segment" element with the time information of time 00:03:00 to 00:04:00 is instructed by the "alt" element with the type of "image", the format of "jpeg", and the storing location of http://mserv.com/IMAGE/s3.jpg. The "segment" element with the time information of time 00:00:40 to 00:05:00 is instructed by the "alt" element with the type of "image", the format of "jpeg", and the storing location of http://mserv.com/IMAGE/s4.jpg.

Further, in the "mediObject" element of "audio" type, MPEG 1 is designated as the format, and http://mserv.com/MPEG/movie0a.mp2 is designated as the storing location. The "mediaObject" element of "audio" type has the "segment" element with the time information of time 00:00:00 to 00:01:00, the "segment" element with the time information of time 00:01:00 to 00:02:00, the "segment" element with the time information of time 00:03:00 to 00:04:00, and the "segment" element with the time information of time 00:04:00 to 00:05:00. In other words, the "mediaObject" element of "audio" type is indicative of a description without time 00:02:00 to 00:03:00.

The "segment" element with the time information of time 00:00:00 to 00:01:00 is instructed by the "alt" element that is the alternative data to audio. The "segment" element with the time information of time 00:00:00 to 00:01:00 is instructed by the "alt" element with the type of "audio", the format of "mpeg1", the storing location of http://mserv.com/MPEG/movie0.mp2, and the time information of time 00:00:00 to 00:01:00. The "segment" element with the time information of time 00:01:00 to 00:02:00 is instructed by the "alt" element with the type of "audio", the format of "mpeg1", the storing location of http://mserv.com/MPEG/movie0.mp2, and the time information of time 00:01:00 to 00:01:30. The "segment" element with the time information of time 00:03:00 to 00:04:00 is instructed by the "alt", element with the type of "audio", the format of "mpeg1", the storing location of http://mserv.com/MPEG/movie0.mp2, and the time information of time 00:03:00 to 00:03:30. The "segment" element with the time information of time 00:00:40 to 00:05:00 is instructed by the "alt" element with the type of "audio", the format of "mpeg1", the storing location of http://mserv.com/MPEG/movie0.mp2, and the time information of time 00:04:00 to 00:05:00.

Also in this embodiment, SMIL is used as the representation description data as in the first embodiment. The SMIL document is output to represent each media segment as in the first embodiment.

The processing will be described below that is performed by description converter 1003 to output the SMIL document for representing alternate data. Such processing is the same as in the flowchart of FIG. 4 in the first embodiment except the processing of steps S405 and S412 for outputting the SMIL document, which will be only described. Thus, the processing different from that in the first embodiment is explained. First, the processing corresponding to step S405 will be described using FIG. 16.

Description converter 1003 outputs a header of SMIL (step S1601). The converter 1003 next encloses the entire media segments by <seq> and </seq> (step S1602). Then, for each of the enclosed media segments, the converter 1003 judges whether there is alternative data with different media types (step S1603).

When description converter 1003 judges at S1603 that there is no alternative data with different media types, the converter 1003 further examines whether there is a plurality of items of alternative data (step S1604). When there is a plurality of items of alternative data, description converter 1003 encloses the plurality of items of alternative data by <seq> and </seq> (step S1605). Meanwhile, when there is one item of alternative data, the converter 1003 does not enclose the alternative data by <seq> and </seq>, and executes the following processing for each alternative data.

In accordance with the type of the alternative data, description converter 1003 selects a corresponding element from the "audio" element, "video" element, "img" element and so on of SMIL (step S1606). When the "start" attribute and "end" attribute are designated in a "pos" element as a child element of the "alt" element, description converter 1003 sets "clip-begin" and "clip-end" of SMIL respectively at a value of the "start" attribute and a value of the "end" attribute (step S1607). Then, the converter 1003 sets the "src" attribute indicative of a storing location for each alternative data (step S1608).

Meanwhile, when description converter 1003 judges at S1603 that there is alternative data with different media types, the converter 1003 groups together the alternative data with the same media type (step S1609).

Description converter 1003 next needs to examine alternative data with the longest duration in order to acquire synchronization among the groups in finishing the representation. Therefore, the converter 1003 calculates the duration for each group from the values of "start" and "end" attributes of the alternative data (step S1610). In addition, when the media type is still picture ("image") or the "start" and "end" attributes are not designated, the duration of the alternative data is set to 0.

Description converter 1003 sets an "endsync" attribute of the "par" element of SMIL so as to synchronize the representation end timing with that of the group with the longest duration (step S1611), and encloses the entire group by <seq> and </seq> to perform the processing of S1604 for each group of each media type.

The "endsync" attribute is for use in a case where the duration is different between media in representing/displaying in parallel a plurality of media enclosed by <par> and </par>. In other words, the "endsync" attribute is to designate in such a case media to which all other media are synchronized in finishing the representation/display. There are a few methods for designating media in the "endsync" attribute, and this embodiment uses a method for designating media using "id" thereof. Specifically, "id", which is an identification, is assigned to the attribute of media of a type. Then, by setting the "endsync" attribute="id", media belonging to the same group as the media assigned the "id" are synchronized and finished in accordance with the end time of the media assigned the "id".

Thus, with respect to media with no duration such as a still picture and/or media in which its display time is not designated by an attribute such as "dur", it is possible to make the representation end time of such media the same as that of the media assigned "id". For example, it is possible to continue to display a still picture during the time the media of audio is represented.

FIG. 17 illustrates the SMIL document output by the above processing using the structure description data illustrated in FIG. 14.

A plurality of groups, i.e., groups 1701 to 1704 are described in the SMIL document in FIG. 17. The group denoted by "1701" is composed of the alternative data with the type of "image", the format of "jpeg", and the storing location of http://mserv.com/IMAGE/s0.jpg, and the alternative data with the type of "audio", the format of "mpeg1", the storing location of http://mserv.com/MPEG/movie0.mp2, and the time information of time 00:00:00 to 00:01:00. Further, the alternative data of "audio" type is assigned (a0) as the "id" attribute. In the group 1701, the "endsync", attribute is set to "id(a0)". Thereby, the representation end time of the alternative data included in the group 1701 is synchronized to that of the alternative data of "audio" type. In other words, the alternative data of "image" type is being represented continuously during the time the alternative data of "audio" type is being represented.

In addition, explanations of groups 1702 to 1704 are omitted.

Figure 18:
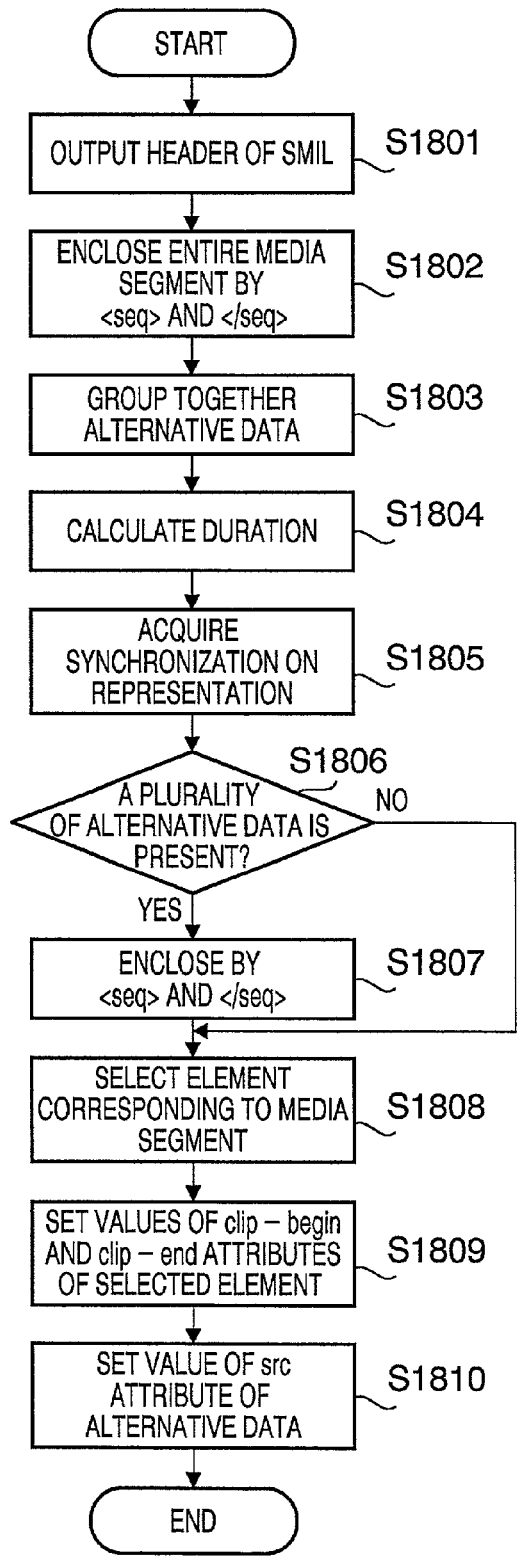
FIG. 18 is a flowchart for the description converter according to the second embodiment to output a representing method description that is the SMIL document from a summary content description that is the structure description data.

The processing corresponding to step S412 is next explained using FIG. 18. Description converter 1003 first outputs a header of SMIL (step S1801). The converter 1003 next encloses the entire media segments by <seq> and </seq> (step S1802).

Description converter 1003 groups together alternative data belonging to the same "mediaObject" element in the order in which the time is fast in the group of the media segment (step S1803), and calculates the duration for each group from values of "start" and "end" attributes (step S1804). In the case where the media type is still picture ("image"), or "start" and "end" attributes are not designated, the duration of the alternative data is set to 0.

Description converter 1003 sets the "endsync" attribute of the "par" element of SMIL so as to synchronize the representation end timing with that of the group with the longest duration, and encloses the entire portion with <par> and </par> (step S1805).

Description converter 1003 next examines whether there is a plurality of items of alternative data (step S1806). When there is a plurality of items of alternative data, the converter 1003 encloses the plurality of items of alternative data by <seq> and </seq> (step S1807). Meanwhile, when there is one item of alternative data, the converter 1003 does not enclose the alternative data by <seq> and </seq>, and executes the following processing for each alternative data.

In accordance with the type of the alternative data, description converter 1003 selects a corresponding element from the "audio" element, "video" element, "img" element and so on of SMIL (step S1808). When the "start" attribute and "end" attribute are designated in the "pos" element as a child element of the "alt" element, description converter 1003 sets "clip-begin" and "clip-end" of SMIL respectively at a value of the "start" attribute and a value of the "end" attribute (step S1809). Then, the converter 1003 sets the "src" attribute indicative of a storing location for each alternative data (step S1810).

In addition, the SMIL document output by the processing illustrated in FIG. 18 using the structure description data illustrated in FIG. 14 is the same as that in FIG. 17.

There is a case that requires to change the representation start time in order to synchronize between clips in the "par" element in the SMIL document. In this case, it is necessary to calculate the representation start time of each clip, and to start the representation at the calculated time.

In SMIL, for such a purpose, the "audio", "video", "img", and "ref" elements are each provided with a "begin" attribute, and using those enables the achievement.

As described above, according to the second embodiment, it is possible to convert the structure description data in which the structure of the entire or part of the media contents is described with time information of media segments and a set of alternative data which, for example, is indicative of a representative image when the media segment is of moving picture into representation description data that expresses the representation order, representation timing and synchronization information of the media segments or the alternative data to the segments described in the structure description data.

It is thereby possible to generate the information on the representation of display media suitable for a terminal capability, from the information on the structure of media contents. As a result, it is possible to generate distribution data suitable for a terminal capability in distributing media contents.

Third Embodiment

In the third embodiment, in order to perform representation and distribution of media contents suitable for a terminal capability, in the structure description data are described media segments, alternative data to the segments, and data for switching between the media segments and alternative data corresponding to the terminal capability. Then, the structure description data is converted into the representation description data for switching between the media segments and alternative data corresponding to the terminal to express.

The third embodiment of the present invention will be described below. In the representation description data of the third embodiment, two cases, i.e., a case of representing media segments and another case of representing the alternative data, are described in one SMIL document to be output. Examples used as the structure description data are as illustrated in FIGS. 14 and 15.

Both cases of representing media segments and of representing the alternative data are described in the representation description data output in this embodiment. When the media contents are represented based on the representation description data, it is necessary to select either a case of representing media segments or another case of representing the alternative data to represent. Therefore, in the representation description data is described a condition for the selection.

Since a condition for the selection is capable of being described with a "switch" element in SMIL, the representation description data in this embodiment also uses the SMIL document. The "switch" element is for use in selecting one meeting the condition from among a plurality of media. In the selection, media are evaluated in the order in which those are described in the content of the "switch" element, and the media that meets the condition for the first time is selected. The condition is provided in an attribute of the media described in the content of the "switch" element, and examples are a "system-bitrate" attribute, "system-caption" attribute and so on.

In this embodiment, the condition is assumed to be a connection bit rate of a network that distributes media contents. Specifically, it is assumed to represent media contents when the connection bit rate is equal to or more than 56 kbps, while representing the alternative data when the connection bit rate is less than 56 kbps.

Figure 19:
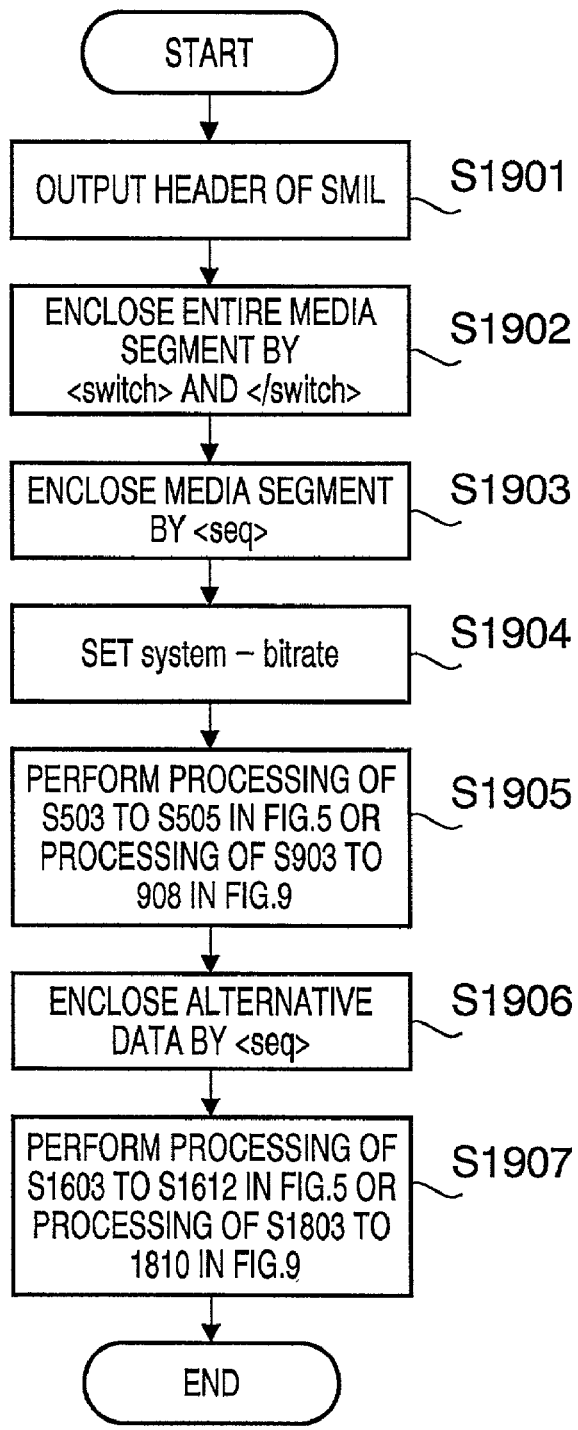
FIG. 19 is a flowchart for converting the structure description data into the representation description data in a third embodiment.

The processing will be described below that is performed by description converter 1003 to output the SMIL document for representing media segments or alternate data. Such processing is the same as in the flowchart of FIG. 4 in the first embodiment except part of the processing of steps S405 and S412 for outputting the SMIL document. Thus, the processing corresponding to the step S405 or step S412 will be only described using FIG. 19.

Description converter 1003 outputs a header of SMIL (step S1901). The converter 1003 next encloses the entire media by <switch> and </switch> (step S1902). Then, the converter 1003 next encloses the media segment by <seq> and </seq> (step S1803), and sets a "system-bitrate" attribute of the "seq" element at 56000, i.e., "system-bitrate"=56000 (step S1904).

The "system-bitrate" attribute is used in condition evaluation in the "switch" element, and is to designate a band available for the system with the number of bits per second. When a value is obtained that is equal to or more than the value of "system-bitrate", the "switch" element is judged to meet the condition. In the above example, when the bit rate is equal to or more than 56000 bps, it is judged to meet the condition. Then, when the condition is satisfied for the first time in the "switch" element, media with the condition first satisfied is selected.

Description converter 1003 executes the processing of S503 to S505 illustrated in FIG. 5 or the processing of S903 to S908 (step S1905), and thereby outputs the SMIL document for representing the media segments.

In this case, by neglecting the "alt" element expressive of the alternative data, it is possible to use the processing procedure of the step S405 or S412 in the first embodiment.

Figure 16:
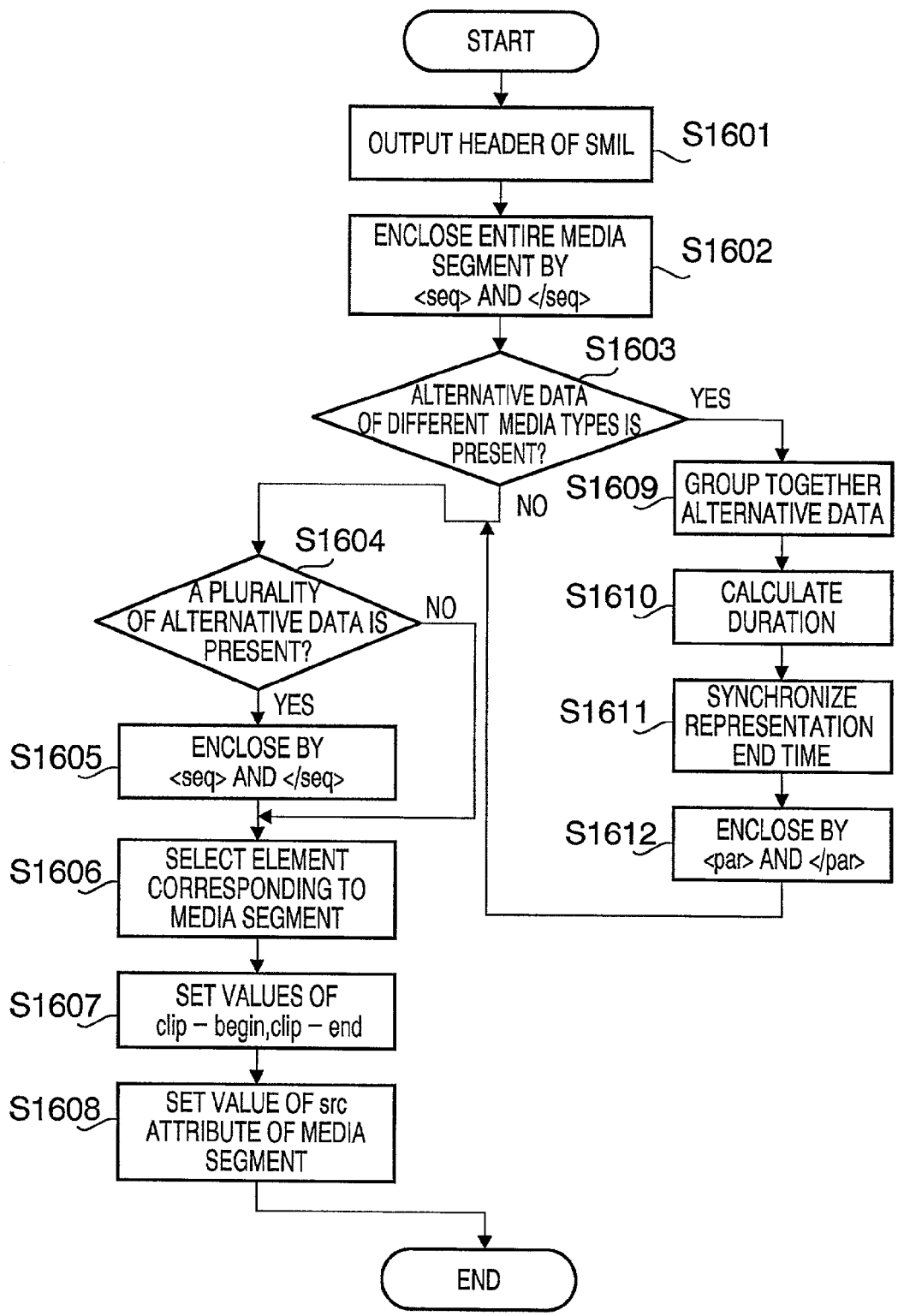
FIG. 16 is a flowchart for a description converter according to the second embodiment to output a representing method description that is the SMIL document from a summary content description that is the structure description data.

Next, description converter 1003 does not set the "system-bitrate" attribute of the "seq" element, but encloses the alternative data by <seq> and </seq> (step S1906), and executes the processing of S1603 to S1612 in FIG. 16 or the processing of S1803 to S1810 in FIG. 18 illustrated in the second embodiment (step S1907). The converter 1003 thereby outputs the SMIL document for representing the alternative data.

The SMIL document is thus generated that enables the selection on whether to represent the media segments or alternative data.

FIG. 20 illustrates the SMIL document output in the third embodiment. In the SMIL document illustrated in FIG. 20 is described a "switch" element 2000 which has two "seq" elements, i.e., 2001 and 2002. One "seq" element, i.e., 2001 includes a portion of from <seq system-bitrate="56000"> to a first </seq>, and another "seq" element, i.e., 2002 includes a portion of from <seq> following the first </seq> to </seq>. The "switch" element evaluates <seq system-bitrate="56000">. When the bit rate available in the system to use is equal to or more than 56000 bps and thereby meets the condition, the "seq" element 2001 is selected. When the bit rate available in the system is less than 56000 bps, the "seq" element 2001 is not selected, and the "seq" element 2002 is evaluated.

The "seq" element 2001 is a portion indicative of representing the media segments, while the "seq" element 2002 is a portion indicative of representing the alternative data. Accordingly, when the bit rate available in the system is equal to or more than 56000 bps, the media segments are represented, while when the bit rate available in the system is less than 56000 bps, the alternative data is represented.

In addition, in this embodiment, as a condition for the selection on whether to represent the media segments or alternative data, a connection bit rate of a system is used, but, other conditions may be used. Such a case, however, may include a condition disabling the use of "switch" element of SMIL, and therefore needs to define the representation description data with the "switch" element of SMIL extended.

Otherwise, as illustrated in FIG. 21A, "alt" in the structure description data is extended to have a child element called "condition" in which a condition for using the alternative data designated therein is described, and according to the condition designated in "condition", either case is selected.

FIG. 21B illustrates the structure description data using the child element called "condition". The structure description data illustrated in FIG. 21B is indicative of composing the representation description data so as to use data described in an immediately upper line when a system uses narrow band.

In order to synchronize between clips in the "par" element in the SMIL document, there arises a case that needs to differ the representation start time. In this case, the representation start time of each clip is calculated, and the representation is started at the calculated time.

In SMIL, for such a purpose, the "audio" element, "video" element, "img" element, and "ref" element each is provided with a "begin" attribute, and using those enables the achievement.

As described above, according to the third embodiment, it is possible to convert the structure description data in which the structure of the entire or part of the media contents is described with time information of media segments and a set of alternative data which, for example, is indicative of a representative image when the media segment is of moving picture into the representation description data that expresses information indicative of the representation orders, representation timing and synchronization information of the media segments and of the alternative data to the segments described in the structure description data and further indicative of selecting the media segments or the alternative data to represent. It is thereby possible to generate the information on the representation including the selection of the media segments or alternative data from the information on the structure of the media contents corresponding to a terminal.

Fourth Embodiment

In the fourth embodiment, with respect to continuous audio visual information (media contents) in which image information and audio information are synchronized, in order to represent and distribute only a representative part of the media contents such as an outline and highlight scene, inputs are the structure description data with the structure of the media contents expressed by a set of portions (media segments) obtained by dividing the media contents, with time information of each media segment, and with an importance degree based on the context content of the media segment, and a threshold of the importance degree based on the context content, and only media segments each with the importance degree not less than the threshold are selected from the structure description data. Then, the structure description data on the selected media segments is converted into representation description data expressive of the representation order and representation timing of the selected media segments as representation aspects, and the resultant data is output.

Only the media segments with high importance degrees are thus selected from the information on the structure of the media contents, whereby it is possible to select only the media segments composing an outline or highlight scene and to convert the structure data into the representation description data on the representation of only the selected media segments.

The fourth embodiment of the present invention will be described below. The fourth embodiment relates to a structure where the alternative data to a media segment is not designated. FIG. 22 illustrates a block diagram of a data processing apparatus in the fourth embodiment. In FIG. 22, "1501" denotes a summary engine as a selector, "1502" denotes a description converter as converting means, "1503" denotes a content description that is of input data and structure description data, "1504" denotes a selection condition, and "1505" denotes a representing method description that is of output data and representation description data.

FIG. 23 illustrates DTD of the structure description data used in the fourth embodiment. In DTD illustrated in FIG. 23, the "segment" element of DTD illustrated in FIG. 2A is provided with "score" 2301 that is an attribute indicative of an importance degree based on the context content of the media segment. It is assumed that the importance degree is indicated by a positive integer and that its lowest value is 1.

FIG. 24 illustrates an example of content description 1503 that is the structure description data of the fourth embodiment.

As illustrated by "2401" in the figure, each segment is assigned the "score" attribute indicative of the importance degree.

Figure 25:
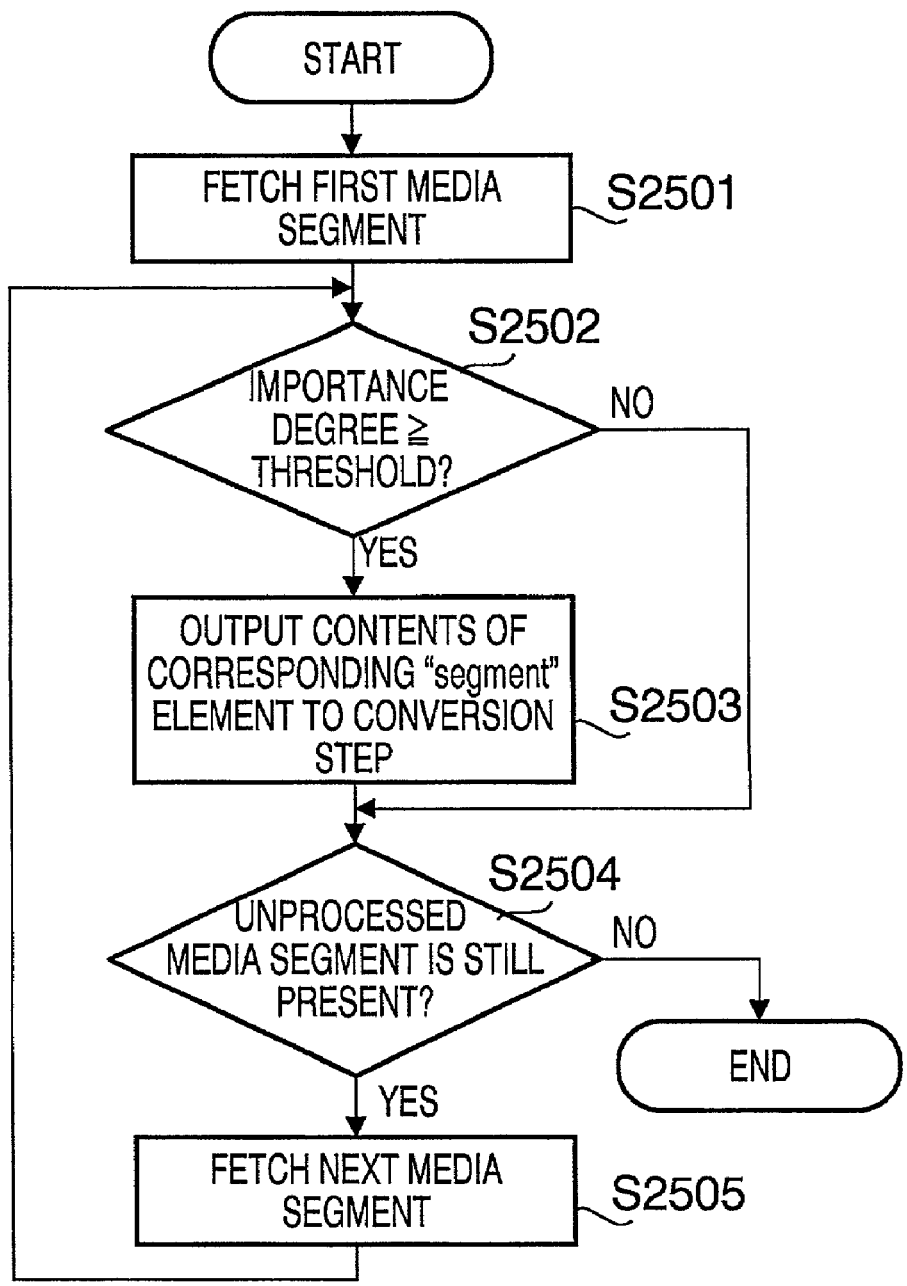
FIG. 25 is a flowchart in processing of a selecting section in the fourth embodiment.

In the fourth embodiment, the importance degree of a media segment is used as selection condition 1504. Summary engine 1501 selects a media segment under the condition that the importance degree of the media segment is equal to or more than a threshold. The processing of summary engine 1501 as selecting means will be described below with reference to the flowchart in FIG. 25.

At step S2501, summary engine 1501 fetches a first media segment described in content description 1503, in other words, the first one in the "segment" element. At step S2502, summary engine 1501 fetches the "score" attribute of the "segment" element indicative of a score of the fetched media segment, and examines whether the "score" attribute is not less than the threshold. When the "score" attribute of the first segment is equal to or more than the threshold, summary engine 1501 shifts to the processing of step S2503, while shifting to the processing of step S2504 when the "score" attribute of the first media segment is less than the threshold.

At step S2503, summary engine 1501 outputs to description converter 1502 as converting means values of the "start" and "end" attributes of the "segment" element that are respectively expressive of start time and end time of the corresponding media segment.

At step S2504, summary engine 1501 examines whether there is any unprocessed media segment. When there is an unprocessed media segment, summary engine 1501 shifts to the processing of step S2505, while finishing the processing when there is no unprocessed media segment.

At step S2505, summary engine 1501 fetches a first "segment" element in the unprocessed media segment, and shifts to the processing of step S2502.

The processing of description converter 1502 as converting means is the same as that of the procedures for converting the structure description data into SMIL in FIG. 4 explained in the first embodiment, and the detailed explanation is omitted.

The fourth embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

FIG. 26 illustrates an example of the intermediate type of structure description data generated from content description 1503 that is the structure description data in FIG. 23 with the threshold of 4.

As can be seen form "2601" in the figure, in the intermediate type of structure description data, media segments with the score equal to or more than 4 are only selected and described.

The selection condition is that the importance degree of a media segment is equal to or more than a threshold, however, another condition may be that the sum total of representation time periods of the selected media segments is equal to or less than a threshold. In this case, summary engine 1501 is set for the processing of sorting all the media segments in descending order of importance degree, and of selecting media segments starting from the first one in sorting so that the sum total of the representation time periods is equal to or less than the threshold and the greatest. Another condition may be obtained by combining the condition on the importance degree of a media segment and the condition on the representation time periods.

As described above, according to the fourth embodiment, media segments are selected by using the importance degree based on the context content of the media segments, whereby it is possible to compose an outline, highlight scene collection and the like and to generate the representation description data thereon. It is thereby possible to represent and distribute the media contents of only a portion that a user desires.

In addition, it may be possible to generate a summary content description with the representation time period of a segment changed corresponding to the importance degree of the segment.

Fifth Embodiment

In contrast to the fourth embodiment limiting a media object to one with image information and audio information, the fifth embodiment includes a case that a plurality of media objects are synchronized to be composed.

The fifth embodiment of the present invention will be described below. The fifth embodiment relates to a structure where the alternative data to a media segment is not designated. A block diagram of a data processing apparatus in the fifth embodiment is the same as that illustrated in FIG. 22.

Also in the fifth embodiment, as DTD for structure description data 1503, the same DTD as illustrated in FIG. 23 is used. FIG. 27 illustrates an example of content description 1503 that is the structure description data in the fifth embodiment.

In content description 1503 illustrated in FIG. 27 are described "mediaObject" element 2701 with the type of "video", and "mediaObject" element 2702 with the type of "audio". As illustrated by "2703" in the figure, in the segment of "mediaObject" element 2701 with the type of "video" is described the "score" attribute indicative of the importance degree. Also as illustrated by "2704" in the figure, in the segment of "mediaObject" element 2702 with the type of "audio" is described the "score" attribute indicative of the importance degree.

Also in the fifth embodiment, it is assumed that selection condition 1504 is that the importance degree of a segment is equal to or more than a threshold. Summary engine 1504 as a selector performs the processing thereof in the fourth embodiment for each "mediaObject" element.—

Figure 28:
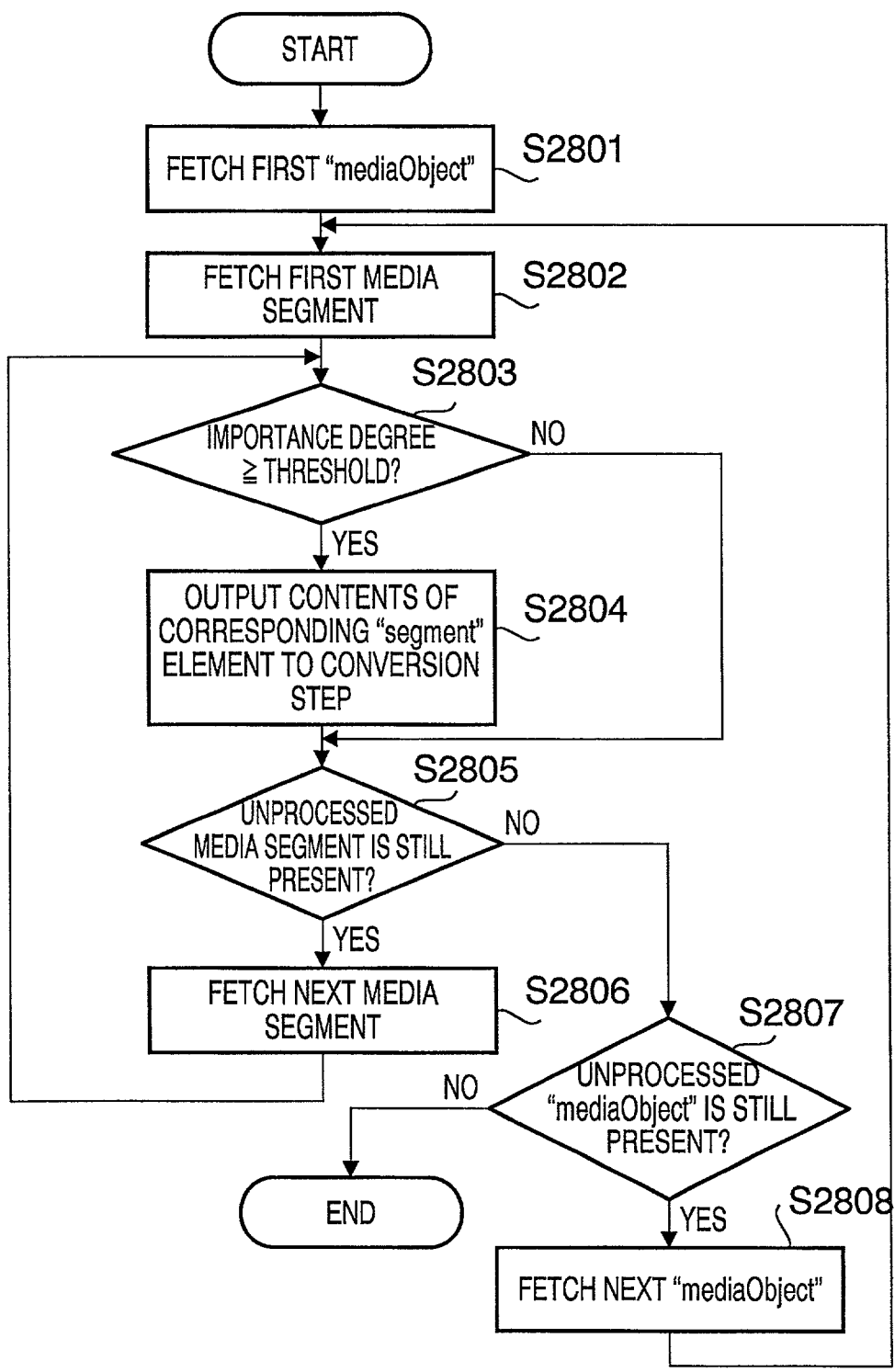
FIG. 28 is a flowchart in processing of a selecting section in the fifth embodiment.

FIG. 28 illustrates a flowchart of the processing of summary engine 1501 in the fifth embodiment.

At step S2801, summary engine 1501 fetches a first "mediaObject" element. At step S2802, summary engine 1501 fetches a first "segment" element among the media segments that are the contents of the fetched "mediaObject" element. At step S2803, summary engine 1501 fetches a value of the "score" attribute of the "segment" element indicative of a score of the fetched media segment, and examines whether the value is not less than the threshold. When the score of the fetched media segment is equal to or more than the threshold, summary engine 1501 shifts to the processing of step S2804, while shifting to the processing of step S2805 when the score of the fetched media segment is less than the threshold. At step S2804, summary engine 1501 outputs to description converter 1502 values of the "start" and "end" attributes of the "segment" element that are respectively start time and end time of the corresponding media segment.

At step S2805, summary engine 1501 examines whether there is any unprocessed media segment. When there is an unprocessed media segment, summary engine 1501 shifts to the processing of step S2806, while shifting to the processing of step S2807 when there is no unprocessed media segment.

Meanwhile, at step S2807, summary engine 1501 examines whether any unprocessed "mediaObject" element is still left, and shifts to the processing of step S2808 when an unprocessed "mediaObject" element is still left, while finishing the processing when no unprocessed "mediaObject" element is left. At step S2808, summary engine 1501 fetches a first "mediaObject" element in the unprocessed "mediaObject" element, and shifts to the processing of step S2802.

Description converter 1502 as converting means in the fifth embodiment also performs, for each "mediaObject" element, the processing the same as that of the procedures for converting the structure description data into SMIL in FIG. 4 explained in the first embodiment.

The fifth embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

FIG. 29 illustrates an example of the intermediate type of structure description data generated from content description 1503 in FIG. 27 with the threshold of 4.

As can be seen form "2901" in the figure, in the "mediaObject" element with the type of "video", media segments with the score equal to or more than 4 are only selected and described. Also, as can be seen form "2902" in the figure, in the "mediaObject" element with the type of "audio", media segments with the score equal to or more than 4 are only selected and described.

With respect to each clip in the "par" element in the SMIL document, there arises a case that needs to differ the representation start time to synchronize between clips. In this case, the representation start time of each clip is calculated, and the representation is started at the calculated time.

In SMIL, for such a purpose, the "audio" element, "video" element, "img" element, and "ref" element are each provided with a "begin" attribute, and using those enables the achievement.

As described above, according to the fifth embodiment, media segments are selected by using the importance degree based on the context content of the media segments, whereby it is possible to compose an outline, highlight scene collection and the like and to generate the representation description data thereon. It is thereby possible to represent and distribute the media contents of only a portion that a user desires.

Sixth Embodiment

The sixth embodiment of the present invention will be described below. In contrast to the fourth embodiment where alternative data to a media segment is not designated, in the sixth embodiment, the alternative data to a media segment is designated. Further, the sixth embodiment relates to a configuration where the summary engine does not perform the selection on whether to represent a media segment or alternative data.

A block diagram of a data processing apparatus in the sixth embodiment is the same as that illustrated in FIG. 22.

FIG. 30 illustrates an example of DTD of the structure description data used in the sixth embodiment. As illustrated by "3001" in the figure, in DTD illustrated in FIG. 30, the "segment" element of DTD illustrated in FIG. 13 is provided with "score" that is an attribute indicative of an importance degree based on the context content of the media segment. It is assumed that the importance degree is indicated by a positive integer and that its lowest value is 1.

FIG. 31 illustrates an example of content description 1503 that is the structure description data. As can be seen from FIG. 31, in each segment composed of alternative data is described the "score" attribute indicative of the importance degree.

The processing of summary engine 1501 as selecting means in the sixth embodiment is the same as that of the summary engine in the fourth embodiment. In addition, summary engine 1501 as selecting means in the sixth embodiment outputs the "alt" element that is a child element as well as the "start" attribute and "end" attribute of the "segment" element in outputting the selected media segment.

The processing of description converter 1502 as converting means in the sixth embodiment is the same as that of the procedures for converting the structure description data into SMIL in FIG. 4 explained in the first to third embodiments.

This embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

FIG. 32 illustrates an example of the intermediate type of structure description data generated from content description 1503 that is the structure description data in FIG. 31 with the threshold of 4.

In the structure description data illustrated in FIG. 32, segments each with a value of the "score" attribute indicative of the importance degree equal to or more than 4 and alternative data to the segments are only selected and described.

Seventh Embodiment

The seventh embodiment of the present invention will be described. In contrast to the fifth embodiment where alternative data to a media segment is not designated, in the seventh embodiment, the alternative data to a media segment is designated. Further, the seventh embodiment relates to a configuration where the alternative data to a media segment is designated, and the summary engine does not perform the selection on whether to represent a media segment or the alternative data.

A block diagram of a data processing apparatus in the seventh embodiment is the same as that illustrated in FIG. 22.

Also in the seventh embodiment, the same DTD as illustrated in FIG. 30 is used as DTD for content description 1503 that is the structure description data. FIG. 33 illustrates an example of content description 1503 that is the structure description data in the seventh embodiment.

The processing of summary engine 1501 as selecting means in the seventh embodiment is the same as that of summary engine 1501 in the fifth embodiment. However, summary engine 1501 according to the seventh embodiment outputs the "alt" element that is a child element as well as the "start" attribute and "end" attribute of the "segment" element in outputting the selected media segment.

The processing of description converter 1502 in the seventh embodiment is the same as that of the procedures for converting the structure description data into SMIL in FIG. 4 explained in the first, second or third embodiment.

This embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

The structure description data illustrated in FIG. 34 is an example of the intermediate type of structure description data generated from content description 1503 in FIG. 33 with the threshold of 4.

In the structure description data illustrated in FIG. 34, segments each with a value of the "score" attribute indicative of the importance degree equal to or more than 4 and alternative data to the segments are described for each type of media.

Eighth Embodiment

The eighth embodiment is intended to represent and distribute, with display media suitable for a terminal capability, only a representative part of media contents such as an outline and highlight scene of continuous audiovisual information (media contents) in which image information and audio information are synchronized. That is, with respect to media contents, inputs are the structure description data with the structure of the media contents expressed by a set of portions (media segments) obtained by dividing the media contents, with time information of each media segment, and with an importance degree based on the context content of the media segment, and a threshold of the importance degree based on the context content, and only media segments each with the importance degree not less than the threshold are selected from the structure description data. Then, either the media segments or alternative data is selected as a representation aspect of the selected media segments, the structure description data on the selected one is converted into representation description data expressive of the representation order and representation timing of selected one, and the resultant data is output.

Only the media segments with high importance degrees are thus selected from the information on the structure of the media contents, whereby it is possible to select only the media segments composing an outline or highlight scene and to convert the structure data into the representation description data on the representation of only the selected media segments. Accordingly, it is possible to achieve the selection of media corresponding to a capability of a terminal for representing the media contents and a condition of a network that distributes the media contents.

The eighth embodiment of the present invention will be described. In contrast to the sixth embodiment where the alternative data to a media segment is designated, and the selection on whether to represent the media segment or alternative data is not performed, in the eighth embodiment, the alternative data to a media segment is designated, and the selection on whether to represent the media segment or alternative data is performed. In the eighth embodiment, the selecting means is divided into media segment selecting means and representation media selecting means. Further, the selection condition is divided into a segment selection condition and representation media selection condition.

FIG. 35 illustrates a block diagram of a data processing apparatus in the eighth embodiment. In FIG. 35, "2801" denotes a summary engine as the media segment selecting means, and "2800" denotes a description converter. Description converter 2800 is composed of representation media selecting section 2802 as the representation media selecting means and converting section 2803 as the converting means.

"2804", denotes a content description that is of input data and structure description data, "2805" denotes a segment selection condition, "2806" denotes a representation media selection condition, and "2807" denotes a representing method description that is of output data and representation description data.

In the eighth embodiment, content description 2804 that is the structure description data is the same as content description 1503 in the sixth embodiment. That is, content description 2804 uses DTD illustrated in FIG. 30, and one example thereof is illustrated in FIG. 31. Segment selection condition 2805 is the same as selection condition 1504 in the fourth embodiment or sixth embodiment. In this case, the processing of summary engine 2801 as the media segment selecting means is the same as that of summary engine 1501 in the sixth embodiment.

The processing of representation media selecting section 2802 is next explained. Representation media selecting section 2802 uses as representation media selection condition 2806 a connection bit rate of a network for distributing media contents. That is, it is assumed that representation media selecting section 2802 represents media segments when the connection bit rate is equal to or more than 56 kbps, while representing the alternative data when the connection bit rate is less than 56 kbps. Representation media selecting section 2802 examines the connection bit rate, judges which is represented, and notifies the result to converting section 2803.

Converting section 2803 receives its inputs elements of the media segments selected by summary engine 2801 as the media segment selecting means and the result selected by representation media selecting section 2802, and based on the result of representation media selecting section 2802, outputs representing method description 2807 that is the representation description data by SMIL.

The processing performed by converting section 2803 to convert content description 2804 into SMIL is the same as that of procedures for converting the structure description data into SMIL in FIG. 4 explained in the first or second embodiment.

In addition, this embodiment has a configuration in which summary engine 2801 outputs the contents of the element of the selected media segment to description converter 2803, and the converter 2803 performs the processing using the contents, however, it may be possible that summary engine 2801 generates the structure description data with selected media segments only left therein, i.e., an intermediate type of the data, and description converter 2803 receives as its input the intermediate type of structure description data to perform the processing.

Further, a bit rate of a network is used as representation media selection condition 2806, however, other conditions may be used such as a capability of a representation terminal and a request from a user.

Ninth Embodiment

The ninth embodiment of the present invention will be described. In contrast to the eighth embodiment where the alternative data to a media segment is designated, and the selection on whether to represent the media segment or alternative data is not performed, in the ninth embodiment, the alternative data to a media segment is designated, and the selection on whether to represent the media segment or alternative data is performed. Further, the ninth embodiment relates to a configuration where the selecting means performs the selection on whether to represent the media segment or alternative data.

Also in the ninth embodiment as in the eighth embodiment, the selecting means is divided into media segment selecting means and representation media selecting means. Further, the selection condition is divided into a segment selection condition and representation media selection condition. Accordingly, a block diagram of a data processing apparatus in this embodiment is the same as that illustrated in FIG. 35.

In the ninth embodiment, content description 2804 that is the structure description data is the same as content description 1503 in the seventh embodiment. That is, content description 2804 uses DTD illustrated in FIG. 30, and an example of content description 2804 is illustrated in FIG. 34. Segment selection condition 2805 is the same as in the eighth embodiment. Accordingly, the processing of summary engine 2801 is the same as that of summary engine 1501 in the seventh embodiment.

The processing of representation media selecting section 2801 according to the ninth embodiment is the same as that described in the eighth embodiment.

Converting section 2803 receives its inputs elements of the media segment selected by summary engine 2801 and the result selected by representation media selecting section 2802, and based on the result of representation media selecting section 2802, outputs representing method description 2807 that is the representation description data by SMIL. The processing performed by converting section 2803 to convert the structure description data into SMIL is the same as that of procedures for converting the structure description data into SMIL in FIG. 4 explained in the first or second embodiment.

In addition, this embodiment has a configuration in which summary engine 2801 outputs the contents of the element of the selected media segment to description converter 2803, and the converter 2803 performs the processing using the contents, however, it may be possible that summary engine 2801 generates the structure description data with selected media segments only left therein, i.e., an intermediate type of the data, and description converter 2803 receives as its input the intermediate type of structure description data to perform the processing.

Further, a bit rate of a network is used as representation media selection condition 2806, however, other conditions may be used such as a capability of a representation terminal and a request from a user.

Tenth Embodiment

The tenth embodiment is intended to perform representation and distribution of only a representative part of media contents suitable for user's preference with respect to continuous audio visual information (media contents) in which image information and audio information are synchronized. That is, in the tenth embodiment, with respect to the media contents, inputs are the structure description data with the structure of the media contents expressed by a set of portions (media segments) obtained by dividing the media contents, with time information of each media segment, and with an importance degree of each media segment based on a viewpoint represented by a keyword, the viewpoint meeting user's preference, and a threshold of the importance degree, and only media segments each with the importance degree not less than the threshold are selected. Then, as a representation aspect of the selected media segments, the structure description data is converted into representation description data expressive of the representation order and representation timing of the media segments, and the resultant data is output. Thus, only the media segments with importance degrees based on the viewpoint not less than the threshold are selected from the information on the structure of the media contents, and the data conversion is performed only on the representation description data on the representation of only the selected media segments. As a result, it is possible to compose a highlight scene collection and the like suiting user's preference by using the importance degree based on the viewpoint, and to represent and distribute only that part.

The tenth embodiment of the present invention will be described below. The tenth embodiment relates to a configuration where the alternative data to a media segment is not designated. A data processing apparatus in the tenth embodiment is the same as that illustrated in FIG. 22.

FIG. 36 illustrates DTD of structure description data used in the tenth embodiment. As illustrated by "3601" in the figure, DTD illustrated in FIG. 36 adds a "pointOfView" element as a child element to the "segment" element of DTD illustrated in FIG. 2A in order to express a score indicative of an importance degree based on a viewpoint represented by a keyword.

Further, as illustrated by "3602" in the figure, the "pointOfView" element expresses a viewpoint by a "viewPoint" attribute, and further expresses the importance degree based on the viewpoint indicated in the "viewPoint" attribute by the "score" attribute. It is assumed that the importance degree is expressed by a positive integer, and that its lowest value is 1. It is possible to provide one "segment" element with a plurality of "pointOfView" elements. FIG. 37 illustrates an example of content description 1503 that is structure description data used in the tenth embodiment.

As can be seen from FIG. 37, for each "segment" element, the "pointOfView" element, and the "viewPoint" attribute and the "score" attribute thereof are described.

Figure 38:
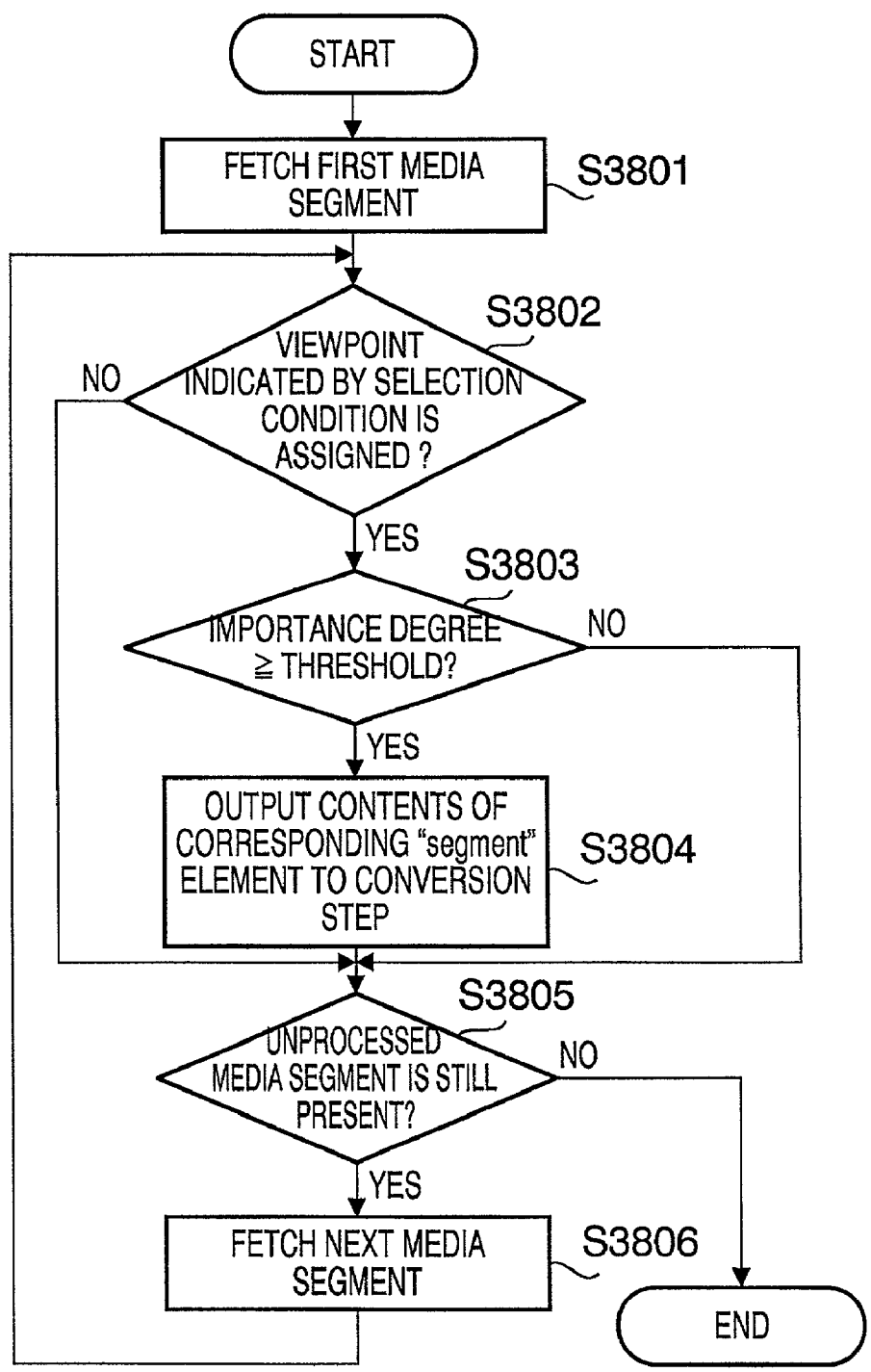
FIG. 38 is a flowchart in processing of a selecting section in the tenth embodiment.

In the tenth embodiment, it is assumed that selection condition 1504 is that the importance degree based on a viewpoint of a media segment is equal to or more than a threshold. The number of viewpoints used in selection condition 1504 is at least one. FIG. 38 illustrates a flowchart of the processing performed by summary engine 1501 as the selecting means in this case.

At step S3801, summary engine 1501 fetches a "segment" element that is the first media segment. At step S3802, summary engine 1501 examines all the "pointOfView" elements that are the contents of the "segment" element that is the fetched media segment. Then, summary engine 1501 examines whether there is any "viewPoint" attribute of the examined "pointOfView" element which is assigned a viewpoint designated by selection condition 1504.

When there is a "viewPoint" attribute assigned the viewpoint designated by selection condition 1504, summary engine 1501 shifts to the processing of step S3803 so as to compare the importance degree based on the viewpoint designated by selection condition 1504 with the threshold. Meanwhile, when there is no "viewPoint" attribute assigned the viewpoint designated by selection condition 1504, since there is no importance degree based on the viewpoint designated by selection condition 1504, summary engine 1501 shifts to the processing of step S3805.

At step 3803, summary engine 1501 examines whether the importance degree based on the viewpoint designated by selection condition 1504 is equal to or more than the threshold. When the importance degree based on the viewpoint designated by selection condition 1504 is equal to or more than the threshold, summary engine 1501 shifts to the processing of step S3804, while performing the processing of step S3805 when the importance degree based on the viewpoint designated by selection condition 1504 is less than the threshold.

At step S3804, summary engine 1501 outputs to description converter 1502 values of the "start" and "end" attributes of the "segment" element that are respectively expressive of start time and end time of the corresponding media segment. At step S3805, summary engine 1501 examines whether there is any unprocessed media segment, and when there is an unprocessed media segment, shifts to the processing of S3806. Meanwhile, when there is no unprocessed media segment, summary engine 1501 finishes the processing.

At step S3806, summary engine 1501 fetches a first "segment" element in the unprocessed media segment, and shifts to the processing of S3802.

The processing of description converter 1502 is the same as that of the procedures for converting the structure description data into SMIL in FIG. 4 explained in the first embodiment.

The tenth embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

The selection condition is that the importance degree associated with a viewpoint of a media segment is equal to or more than a threshold, however, another condition may be that the sum total of representation time periods of the selected media segments is equal to or less than a threshold. In this case, summary engine 1501 performs the processing for sorting all the media segments in descending order of importance degree associated with a designated viewpoint, and for selecting media segments starting from the first one in sorting so that the sum total of the representation time periods is equal to or less than the threshold and the greatest.

When there is a plurality of designated viewpoints, summary engine 1501 may use the largest one among importance degrees associated with the designated viewpoints to sort with the value, or may calculate the sum total or average of the importance degrees to sort with the value.

Another condition may be obtained by combining the condition on the importance degree associated with a viewpoint of a media segment and the condition on the representation duration.

As described above, according to the tenth embodiment, only media segments interesting a user are selected by using the importance degree based on a viewpoint represented by a keyword, whereby it is possible to compose an outline, a highlight scene collection and the like suiting user's preference and to generate the representation description data thereon. It is thereby possible to represent and distribute the media contents of a portion that a user desires.

Eleventh Embodiment

The eleventh embodiment of the present invention will be described below. In contrast to the tenth embodiment which is not provided with a plurality of types of media, the eleventh embodiment relates to a configuration where a plurality of types of media is provided and alternative data to a media segment is not designated. A data processing apparatus in the eleventh embodiment is the same as that illustrated in FIG. 22.

Also in the eleventh embodiment, the same DTD as illustrated in FIG. 36 is used as DTD for content description 1503 that is the structure description data. FIG. 39 illustrates an example of content description 1503 that is structure description data in the eleventh embodiment.

As can be seen from FIG. 39, the structure description data illustrated in FIG. 39 has "mediaObject" elements of different types, and for each "segment" element, the "pointOfView" element, and the "viewPoint" attribute and the "score" attribute thereof are described.

Figure 40:
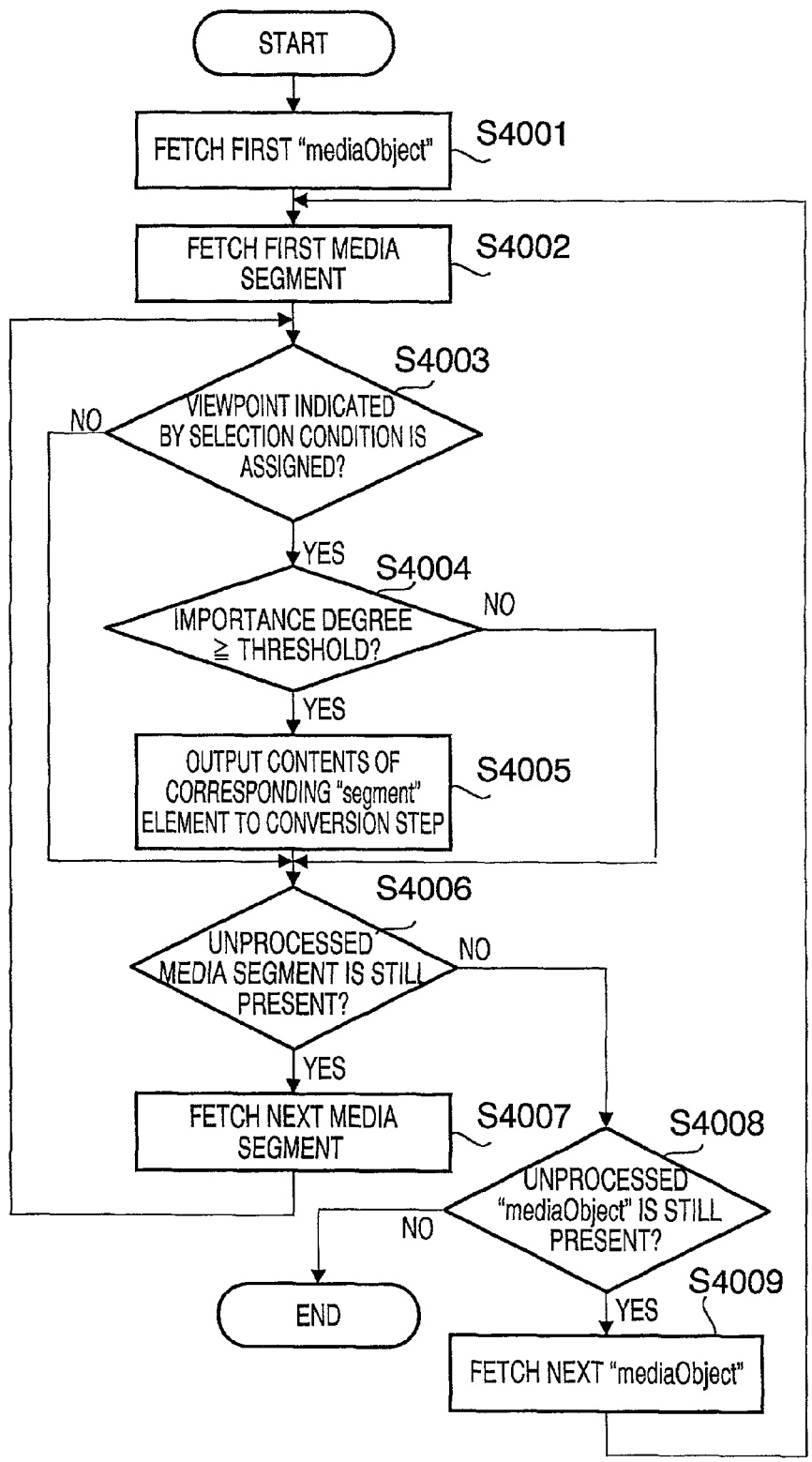
FIG. 40 is a flowchart in processing of a selecting section in the eleventh embodiment of the present invention.

Also in this embodiment, selection condition 1504 is the same as in the tenth embodiment and is assumed to be that the importance degree based on a viewpoint of a media segment is equal to or more than a threshold. The number of viewpoints used in selection condition 1504 is at least one. In this case, summary engine 1501 performs the processing thereof in the tenth embodiment for each "mediaObject" element. FIG. 40 illustrates a flowchart of the processing performed by summary engine 1501 in the eleventh embodiment.

At step S4001, summary engine 1501 fetches a first "mediaObject" element. At step S4002, summary engine 1501 fetches a "segment" element that is the first media segment in the contents of the fetched "mediaObject" element. At step S4803, summary engine 1501 examines all the "pointOfView" elements that are the contents of the "segment" element that is the fetched media segment, and further examines whether there is any "viewPoint" attribute of the examined "pointOfView" element which is assigned a viewpoint designated by selection condition 1504.

When there is a "viewPoint" attribute of the examined "pointOfView" element which is assigned the viewpoint designated by selection condition 1504, summary engine 1501 shifts to the processing of step S4004 so as to compare the importance degree based on the viewpoint designated by selection condition 1504 with the threshold. Meanwhile, when there is no "viewPoint" attribute of the examined "pointOfView" element which is assigned a viewpoint designated by selection condition 1504, since there is no importance degree based on the viewpoint designated by selection condition 1504, summary engine 1501 shifts to the processing of step S4006.

At step 4004, summary engine 1501 examines whether the importance degree based on the viewpoint designated by selection condition 1504 is equal to or more than the threshold. When the importance degree based on the viewpoint designated by selection condition 1504 is equal to or more than the threshold, summary engine 1501 shifts to the processing of step S4005, while shifting to the processing of step S4006 when the importance degree based on the viewpoint designated by selection condition 1504 is less than the threshold.

At step S4005, summary engine 1501 outputs to description converter 1502 values of the "start" and "end" attributes of the "segment" element that are respectively expressive of start time and end time of the corresponding media segment. At step S4006, summary engine 1501 examines whether there is any unprocessed media segment, and when there is an unprocessed media segment, shifts to the processing of step S4007. When there is no unprocessed media segment, summary engine 1501 shifts to the processing of step S4008.

At step S4008, summary engine 1501 examines whether any unprocessed "mediaObject" element is left, and when an unprocessed "mediaObject" element is left, shifts to the processing of step S4009. When no unprocessed "mediaObject" element is left, summary engine 1501 finishes the processing.

At step S4009, summary engine 1501 fetches a first "mediaObject" element in the unprocessed "mediaObject" elements, and shifts to the processing of S4002.

Description converter 1502 in the eleventh embodiment performs the same processing as that of the procedures for converting the structure description data into SMIL in FIG. 4 explained in the first embodiment, except that the converter 1502 performs the processing for each "mediaObject" element.

The eleventh embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

With respect to each clip in the "par" element in the SMIL document, there arises a case that needs to differ the representation start time to synchronize between clips. In this case, the representation start time of each clip is calculated, and the representation is started at the calculated time.

In SMIL, for such a purpose, the "audio" element, "video" element, "img" element, and "ref" element are each provided with a "begin" attribute, and using those enables the achievement.

Twelfth Embodiment

The twelfth embodiment of the present invention will be described. In contrast to the tenth embodiment where alternative data to a media segment is not designated, in the twelfth embodiment, the alternative data to a media segment is designated. Further, the twelfth embodiment relates to a configuration where selecting means does not perform the selection on whether to represent a media segment or the alternative data. A block diagram of a data processing apparatus in the twelfth embodiment is the same as that illustrated in FIG. 22.

FIG. 41 illustrates an example of DTD of structure description data used in the twelfth embodiment. DTD illustrated in FIG. 41 adds a "pointOfView" element as a child element to a "segment" element of DTD illustrated in 13 in order to express a score indicative of an importance degree based on a viewpoint represented by a keyword. The "pointOfView" element expresses a viewpoint by a "viewPoint" attribute, and further expresses the importance degree based on the viewpoint indicated in the "viewPoint" attribute by the "score" attribute. It is assumed that the importance degree is expressed by a positive integer, and that its lowest value is 1. It is possible to provide one "segment" element with a plurality of "pointOfView" elements. FIG. 42 illustrates an example of content description data 1503.

As can be seen from the figure, in the content description data illustrated in FIG. 42, the "pointOfView" is added to the "segment" element of DTD to be a child element. In the "pointOfView" element are described the "viewPoint" attribute and the "score" attribute.

The processing of summary engine 1501 in the twelfth embodiment is the same as that of summary engine 1501 in the tenth embodiment. In addition, summary engine 1501 in the twelfth embodiment outputs the "alt" element that is a child element as well as the "start" attribute and "end" attribute of the "segment" element in outputting the selected media segment.

The processing of description converter 1502 in the twelfth embodiment is the same as that of the procedures for converting the structure description data into SMIL in FIG. 4 explained in the first, second or third embodiment.

This embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

Thirteenth Embodiment

The thirteenth embodiment of the present invention will be described. In contrast to the eleventh embodiment where alternative data to a media segment is not designated, in the thirteenth embodiment, the alternative data to a media segment is designated. Further, the thirteenth embodiment relates to a configuration where selecting means does not perform the selection on whether to represent a media segment or the alternative data. A block diagram of a data processing apparatus in the thirteenth embodiment is the same as that illustrated in FIG. 15.

Also in the thirteenth embodiment, the same DTD as that illustrated in FIG. 41 is used as DTD for content description 1503. FIGS. 43 and 44 illustrate examples of content description 1503 that is structure description data in the thirteenth embodiment.

As can be seen from the figure, the structure description data in the thirteenth embodiment has "mediaObject" elements of different types, and has "segment" elements for each "mediaObject" element. Further, for each "segment" element, the "pointOfView" element, and the "viewPoint" attribute and the "score" attribute thereof are described.

The processing of summary engine 1501 in the thirteenth embodiment is the same as that of summary engine 1501 in the eleventh embodiment. In addition, summary engine 1501 in the thirteenth embodiment outputs the "alt" element that is a child element as well as the "start" attribute and "end" attribute of the "segment" element in outputting the selected media segment.

The processing of description converter 1502 in the thirteenth embodiment is the same as that of the procedures for converting the structure description data into SMIL in FIG. 4 explained in the first, second or third embodiment.

The thirteenth embodiment has a configuration in which summary engine 1501 outputs the contents of the element of the selected media segment to description converter 1502, and the converter 1502 performs the processing using the contents, however, it may be possible that summary engine 1501 generates the structure description data with selected media segments only left therein, i.e., an intermediate type of the data, and description converter 1502 receives as its input the intermediate type of structure description data to perform the processing.

Fourteenth Embodiment

The fourteenth embodiment of the present invention will be described. In contrast to the twelfth embodiment where selecting means does not perform the selection on whether to represent the media segment or alternative data, in the fourteenth embodiment, selecting means performs selection on whether to represent the media segment or alternative data. In the fourteenth embodiment, the selecting means is divided into media segment selecting means and representation media selecting means. Further, the selection condition is divided into a segment selection condition and representation media selection condition. Accordingly, a block diagram of a data processing apparatus in the fourteenth embodiment is the same as that illustrated in FIG. 35.

In the fourteenth embodiment, content description 2804 is the same as content description 1503 in the twelfth embodiment. That is, content description 2804 of the fourteenth embodiment uses DTD illustrated in FIG. 41, and an example of content description 2804 of the fourteenth embodiment is illustrated in FIG. 42.

Segment selection condition 2805 is the same as selection condition 1504 in the tenth or twelfth embodiment. In this case, the processing of summary engine 2801 is the same as that of summary engine 1501 in the twelfth embodiment.

The processing of representation media selecting section 2802 is next explained. Representation media selecting section 2802 uses as representation media selecting condition 2806 a connection bit rate of a network for distributing media contents. In other words, representation media selecting section 2802 represents media segments when the connection bit rate is equal to or more than 56 kbps, while representing the alternative data when the connection bit rate is less than 56 kbps. Representation media selecting section 2802 examines the connection bit rate, judges which is represented, and notifies the result to converting section 2803.

Converting section 2803 receives its inputs elements of the media segments selected by summary engine 2801 as the media segment selecting means and the result selected by representation media selecting section 2902, and based on the result of representation media selecting section 2802, outputs representing method description 2807 that is the representation description data by SMIL.

The processing performed by converting section 2803 to convert content description 2804 into SMIL is the same as that of procedures for converting the structure description data into SMIL in FIG. 4 explained in the first or second embodiment.

In addition, this embodiment has a configuration in which summary engine 2801 outputs the contents of the element of the selected media segment to description converter 2803, and the converter 2803 performs the processing using the contents, however, it may be possible that summary engine 2801 generates the structure description data with selected media segments only left therein, i.e., an intermediate type of the data, and description converter 2803 receives as its input the intermediate type of structure description data to perform the processing.

Further, a bit rate of a network is used as representation media selection condition 2806, however, other conditions may be used such as a capability of a representation terminal and a request from a user.

Fifteenth Embodiment

The fifteenth embodiment of the present invention will be described. In contrast to the thirteenth embodiment where selecting means does not perform the selection on whether to represent the media segment or alternative data, in the fifteenth embodiment, selecting means performs selection on whether to represent the media segment or alternative data. Also in the fifteenth embodiment, in the same as in the eighth embodiment, the selecting means is divided into media segment selecting means and representation media selecting means. Further, the selection condition is divided into a segment selection condition and representation media selection condition. Accordingly, a block diagram of a data processing apparatus in this embodiment is the same as that illustrated in FIG. 35.

In the fifteenth embodiment, content description 2804 is the same as content description 1503 in the thirteenth embodiment. That is, content description 2804 of the fifteenth embodiment uses DTD illustrated in FIG. 41, and examples of the content description 2804 of the fifteenth embodiment are illustrated in FIGS. 43 and 44.

Segment selection condition 2805 in the fifteenth embodiment is the same as selection condition 1504 in the fourteenth embodiment. Accordingly, the processing of summary engine 2801 is the same as that of summary engine 1501 in the thirteenth embodiment.

The processing of representation media selecting section 2802 according to the fifteenth embodiment is the same as that of representation media selecting section 2802 described in the fourteenth embodiment.

Converting section 2803 of the fifteenth embodiment receives its inputs elements of the media segments selected by summary engine 2801 and the result selected by representation media selecting section 2802, and based on the result of representation media selecting section 2802, outputs representing method description 2807 that is the representation description data by SMIL.

The processing performed by converting section 2803 of the fifteenth embodiment to convert content description 2804 into SMIL is the same as that of procedures for converting the structure description data into SMIL in FIG. 4 explained in the first or second embodiment.

In addition, this embodiment has a configuration in which summary engine 2801 outputs the contents of the element of the selected media segment to description converter 2803, and the converter 2803 performs the processing using the contents, however, it may be possible that summary engine 2801 generates the structure description data with selected media segments only left therein, i.e., an intermediate type of the data, and description converter 2803 receives as its input the intermediate type of structure description data to perform the processing.

Further, a bit rate of a network is used as representation media selection condition 2806, however, other conditions may be used such as a capability of a representation terminal and a request from a user.

Sixteenth Embodiment

Figure 45:
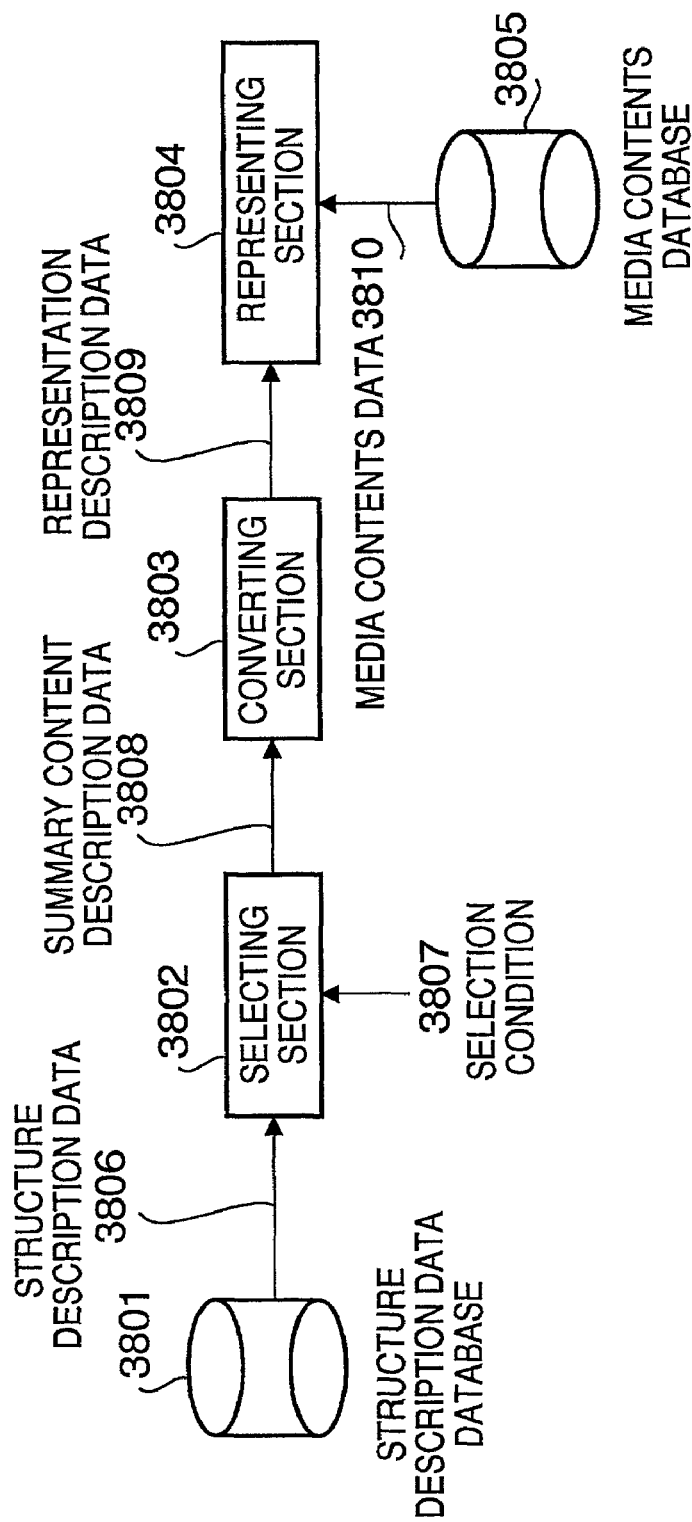
FIG. 45 is a block diagram of a data processing apparatus according to a sixteenth embodiment of the present invention.

The sixteenth embodiment of the present invention will be described. FIG. 45 illustrates a block diagram of a data processing apparatus in the sixteenth embodiment. In FIG. 45, "3801" denotes a structure description data database, "3802" denotes a selecting section, "3803" denotes a converting section, "3804" denotes a representing section, "3805" denotes a media contents database, "3806" denotes structure description data, "3807" denotes selection condition, "3808" denotes summary content description data, "3809", denotes representation description data, and "3810" denotes media contents data.

Selecting section 3802, converting section 3803, structure description data 3806 and representation description data 3809 are respectively the same as those illustrated in any one of the fourth to fifteenth embodiments. Summary structure description data 3803 corresponds to the intermediate type of structure description data with only the selected media segments left explained in any one of the fourth to fifteenth embodiments. Selecting section 3802 and converting section 3803 are achieved by executing a corresponding program on a computer.

As representing section 3804, since representation description data 3809 is expressed by SMIL, a SMIL player is capable of being used. The SMIL player is achieved by executing a corresponding program on a computer, and as SMIL player software, for example, free software such as Real Player of Real Networks is circulated.

In addition, in the sixteenth embodiment, selecting section 3802 outputs summary structure description data 3803, however, as illustrated in any one of the fourth to fifteenth embodiment, a configuration may be possible where the section 3802 outputs selected media segments instead of outputting summary structure description data 3808.

Seventeenth Embodiment

Figure 46:
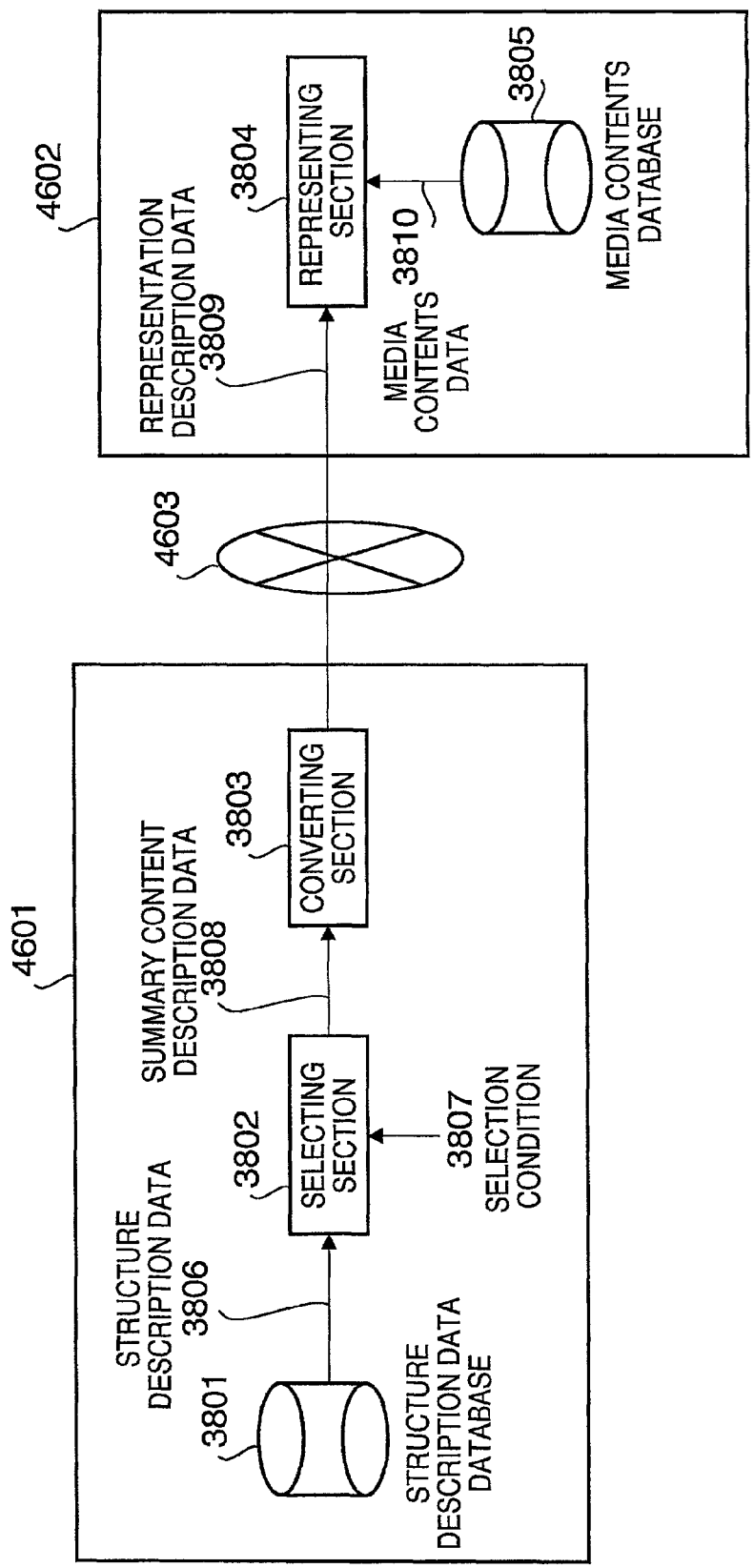
FIG. 46 is a block diagram of a server client system in a seventeenth embodiment of the present invention.

A sever client system according to the seventeenth embodiment of the present invention will be described with reference to FIG. 46. In the seventeenth embodiment, selecting section 3802 and converting section 3803 are provided on a side of sever 4601, and representing section 3804 is provided on a side of client 4602. Then in the seventeenth embodiment, converting section 3803 and representing section 3804 are connected over network 4602. The seventeenth embodiment thereby provides the sever client system for communicating representation description data 3809 through the network.

The processing contents that each processing section executes are described as corresponding programs executable by a computer, and stored in storage media on sides of sever 4601 and client 4602 to be executed.

In addition, it may be possible to use metadata database 1001 instead of structure description database 3801, summary engines 1002, 1501 and 2801 instead of selecting section 3802, description converters 1003, 1502 and 2800 instead of converting section 3803, representation unit 1004 instead of representing section 3804, and media contents database 1005 instead of media contents database 3805.

Figure 47:
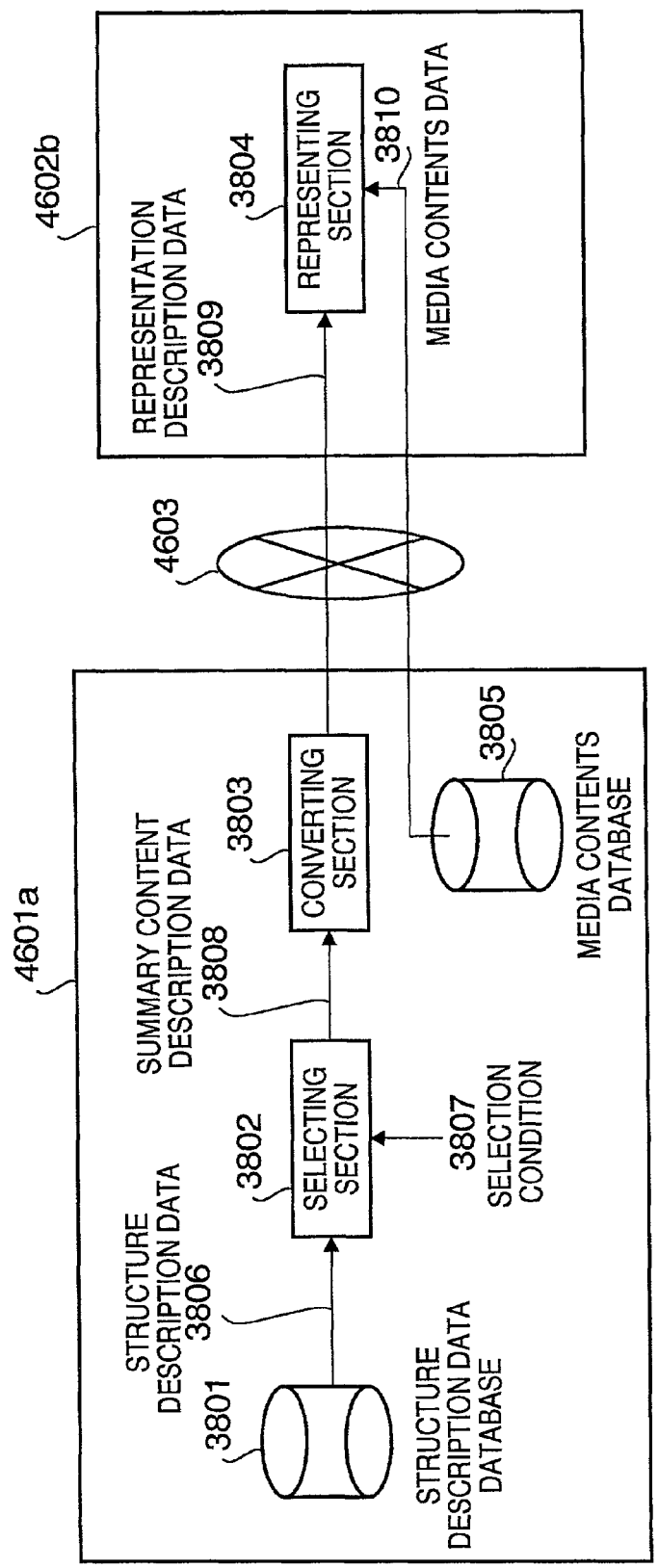
FIG. 47 is a block diagram of another example of the server client system in a seventeenth embodiment.

Further, as illustrated in FIG. 47, the seventeenth embodiment may have a configuration where sever 4601*a* is provided with media contents database 3805, and transmits media contents data 3810 to client 4602*a* through network 4603.

Eighteenth Embodiment

A server client system according to the eighteenth embodiment of the present invention will be described.

Figure 48:
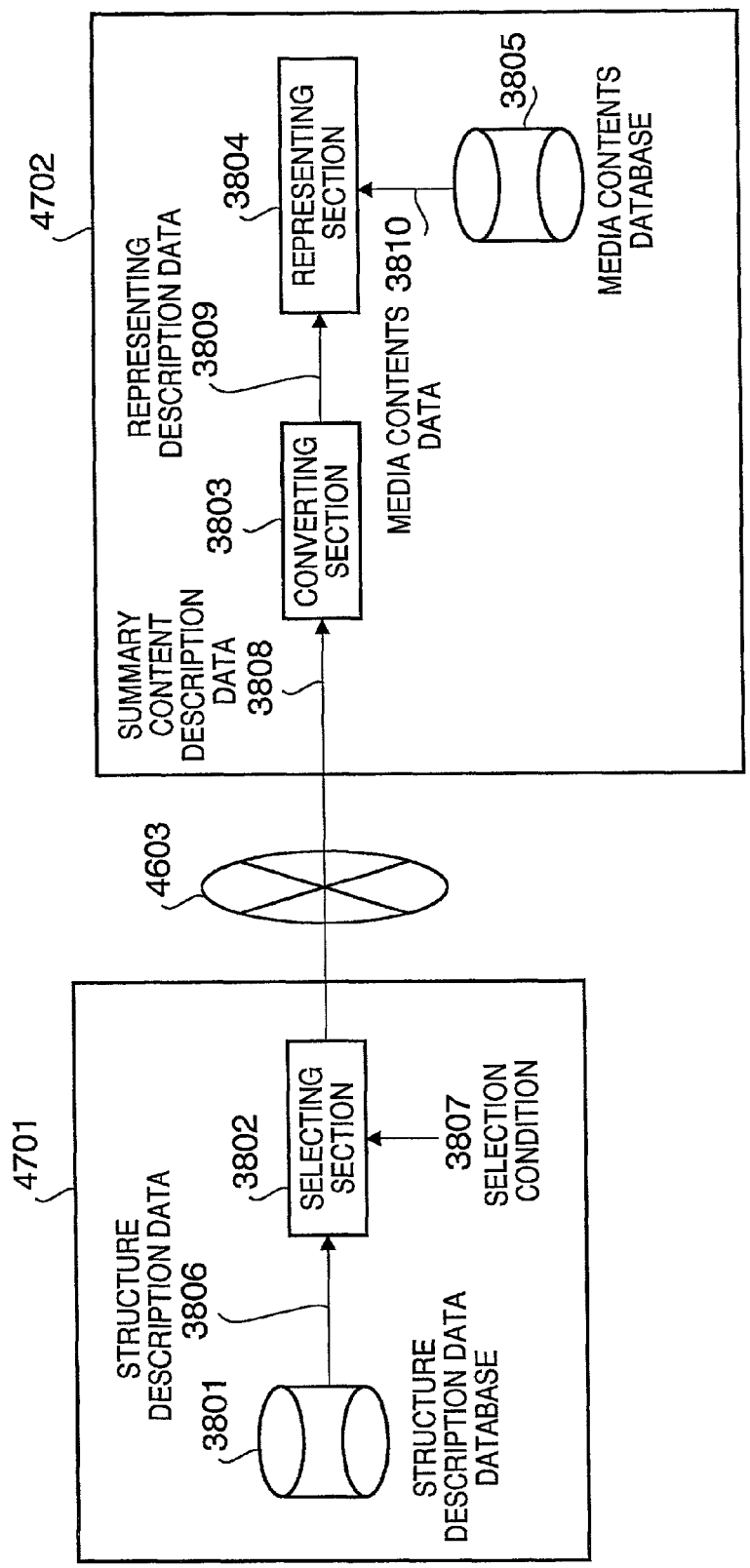
FIG. 48 is a block diagram of a server client system in an eighteenth embodiment of the present invention.

The eighteenth embodiment is explained using FIG. 48. In the eighteenth embodiment, selecting section 3802 is provided on a side of sever 4701, and converting section 3803 and representing section 3804 are provided on a side of client 4702. Then in the eighteenth embodiment, selecting section 3802 and converting section 3803 are connected over network 4603. The eighteenth embodiment thereby provides the sever client system for communicating summary structure description data 3808 through the network.

The processing contents that each processing section executes are described as corresponding programs executable by a computer, and stored in storage media on sides of sever 4701 and client 4702 to be executed.

In addition, it may be possible to use metadata database 1001 instead of structure description database 3801, summary engines 1002, 1501 and 2801 instead of selecting section 3802, description converters 1003, 1502 and 2800 instead of converting section 3803, representation unit 1004 instead of representing section 3804, and media contents database 1005 instead of media contents database 3805.

Figure 49:
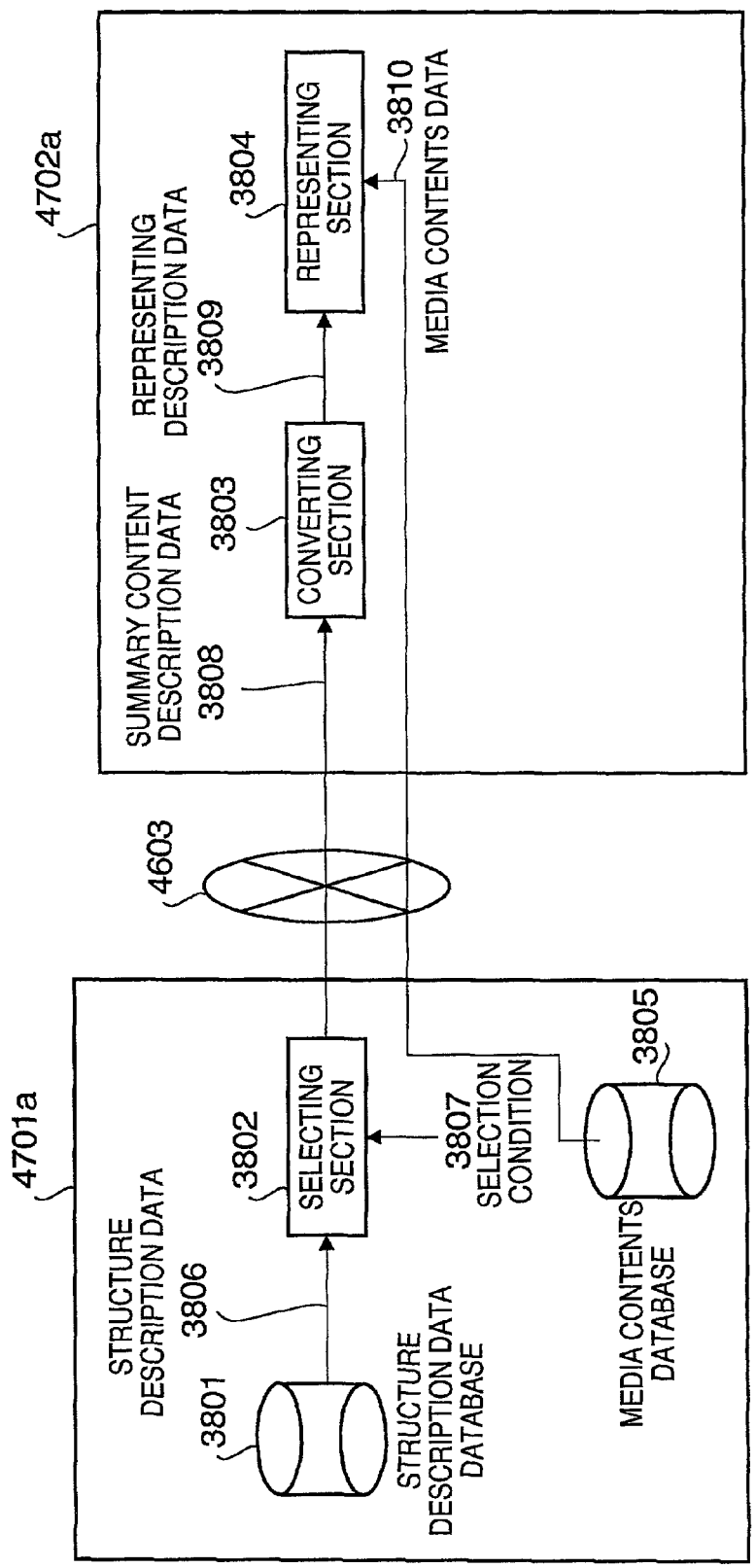
FIG. 49 is a block diagram of another example of the server client system in the eighteenth embodiment.
Figure 50:
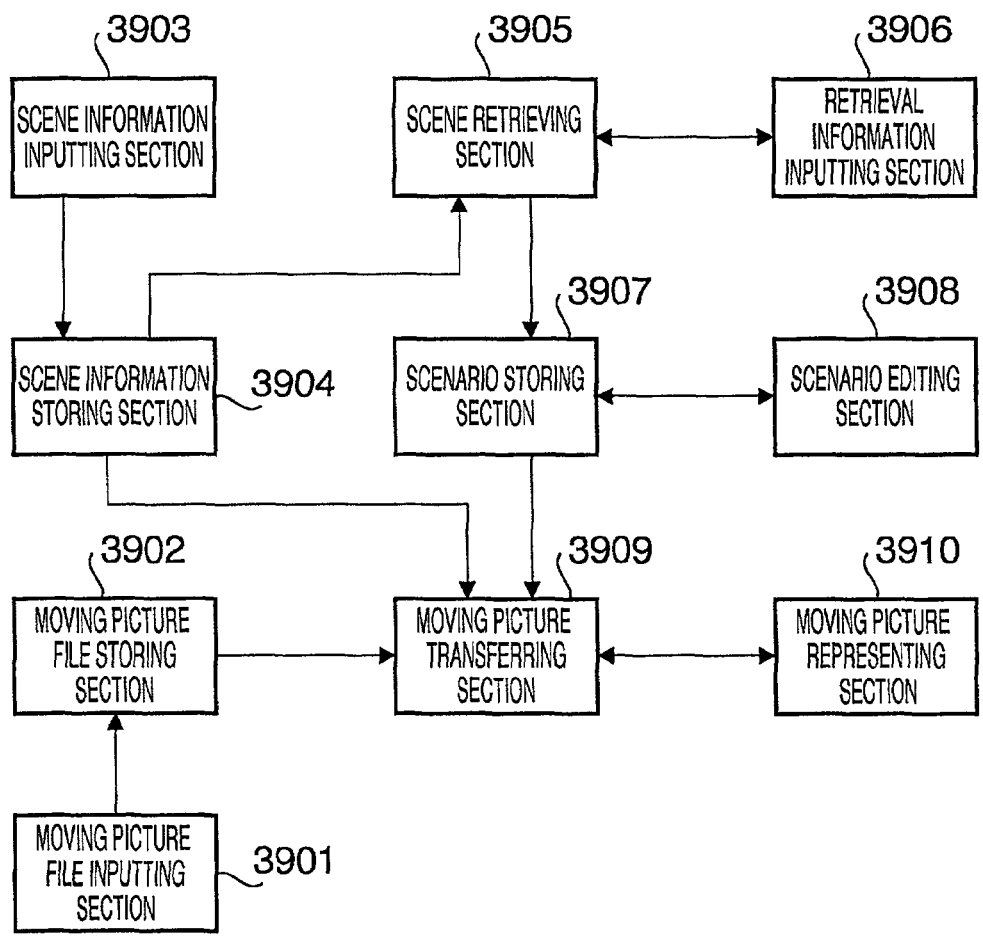
FIG. 50 is a block diagram of a conventional moving picture distributing apparatus.

Further, as illustrated in FIG. 49, the eighteenth embodiment may have a configuration where sever 4701*a* is provided with media contents database 3805, and transmits media contents data 3810 to client 4702*a* through network 4603.

As explained above, according to the present invention, it is possible to convert structure description data with the structure of media contents composed of media segments described therein into representation description data expressive of an aspect for representing the media contents. It is thereby possible to add conditions such as representation timing and synchronization information to each media segment in representing the media contents.

Further, according to the present invention, the alternative data to the media segments is described in the structure description data, whereby it is possible to select whether to represent the media segments themselves or the alternative data. It is thereby possible to distribute and represent the contents by media suiting a capacity and traffic amount of a network that distributes the media contents and a capability of a terminal that represents the media contents.

Furthermore, according to the present invention, a score based on the context content of each media segment is further described in structure description data, whereby it is possible to easily perform the representation and distribution of, for example, highlight scene collections with different representation time periods. Moreover, by setting the score based on a viewpoint indicated by a keyword, designating the keyword enables only a scene suiting user's preference to be represented and distributed.

The present invention is not limited to the above described embodiments, and various variations and modifications may be possible without departing from the scope of the present invention.

This application is based on the Japanese Patent Applications No. 2000-177955 filed on Jun. 14, 2000 and No. 2001-159409 filed on May 28, 2001, entire content of which is expressly incorporated by reference herein.

What is claimed is:

1. A computer readable medium which stores a program comprising:
   an analyzer that receives as input structure description data in which media content is described, the media content being continuous audiovisual information, the structure description data describing types of media included in the media content, addresses indicating locations of the media content, and a plurality of segments that use the media, expressed in time information, wherein the analyzer extracts the time information of the segments from the structure description data; and
   a converter that automatically organizes the types of media and the addresses per extracted time information, and automatically arranges the types of media and addresses in an order of representation, thereby automatically converting the structure description data into representation description data that specifies an order of representation and synchronization information of the segments.

2. The computer readable medium according to claim 1, wherein the structure description data describes a set of alternative data to the media content.

3. The computer readable medium according to claim 2, wherein the converter describes, in the representation description data, selection conditions for selecting the media content and alternative data, and the data processing apparatus selects and represents one of the media content and the alternative data in accordance with the selection conditions.

4. The computer readable medium according to claim 2, wherein the alternative data comprises one of a representative image of media and audio information.

5. The computer readable medium according to claim 1, wherein the representation description data is a SMIL document.

6. The computer readable medium according to claim 1, wherein when time information is continuous between at least two segments of the same media content, the converter connects said segments and organizes the time information of said segments, the type of said media, and the addresses indicating locations of said media content.

7. A computer readable medium which stores a program comprising:
- a selector that receives as inputs structure description data in which media content is described and a selection condition, the media content being continuous audiovisual information, the structure description data describing types of media included in the media content, addresses indicating locations of the media content, a plurality of segments that use the media, expressed in time information, and at least one media content score, wherein the selector selects at least part of the media content based on the selection condition and the at least one media content score;
- a converter that automatically organizes the types of media of the selected media content and the addresses per extracted time information, and automatically arranges the types of media and addresses in an order of representation, thereby automatically converting the structure description data into representation description data that specifies an order of representation and synchronization information of the segments; and
- a representer that receives the representation description data and the selected media content, and represents the selected media content according to the representation description data.

8. A server-client system, comprising:
- a server comprising the selector and converter according to claim 7;
- a client comprising the representer according to claim 7; and
- a network that connects said server and said client, wherein the representation description data is communicated between said server and said client.

9. A server-client system, comprising:
- a server comprising the selector according to claim 7;
- a client comprising the converter and the representer according to claim 7; and
- a network that connects said server and said client, wherein only structure description data corresponding to the selected media content is communicated between said server and said client.

10. The computer readable medium according to claim 7, wherein the structure description data describes a set of alternative data to the media content.

11. The apparatus computer readable medium according to claim 10, wherein the converter describes, in the representation description data, selection conditions for selecting the media content and alternative data, and the data processing apparatus selects and represents one of the media content and the alternative data in accordance with the selection conditions.

12. The computer readable medium according to claim 10, wherein the alternative data comprises one of a representative image of media and audio information.

13. The computer readable medium according to claim 7, wherein the representation description data is a SMIL document.

14. The computer readable medium according to claim 7, wherein when time information is continuous between at least two segments of the same media content, the converter connects said segments and organizes the time information of said segments, the type of said media, and the addresses indicating locations of said media content.

* * * * *

UNITED STATES PATENT AND TRADEMARK OFFICE
CERTIFICATE OF CORRECTION

| | |
|---|---|
| PATENT NO. | : 7,765,468 B2 |
| APPLICATION NO. | : 09/877035 |
| DATED | : July 27, 2010 |
| INVENTOR(S) | : T. Munetsugu et al. |

It is certified that error appears in the above-identified patent and that said Letters Patent is hereby corrected as shown below:

At column 38, line 12 (claim 11, line 1) of the printed patent, please delete the word "apparatus".

Signed and Sealed this

Thirtieth Day of November, 2010

David J. Kappos
*Director of the United States Patent and Trademark Office*